United States Patent
Schmidt

(10) Patent No.: US 12,467,062 B2
(45) Date of Patent: Nov. 11, 2025

(54) TRANSGENIC MOUSE EXPRESSING COMMON HUMAN LIGHT CHAIN

(71) Applicant: Compass Therapeutics LLC, Brighton, MA (US)

(72) Inventor: Michael March Schmidt, Wellesley, MA (US)

(73) Assignee: Compass Therapeutics LLC, Cambridge, MA (US)

( * ) Notice: Subject to any disclaimer, the term of this patent is extended or adjusted under 35 U.S.C. 154(b) by 1096 days.

(21) Appl. No.: 17/416,739

(22) PCT Filed: Dec. 20, 2019

(86) PCT No.: PCT/US2019/068039
§ 371 (c)(1),
(2) Date: Jun. 21, 2021

(87) PCT Pub. No.: WO2020/132557
PCT Pub. Date: Jun. 25, 2020

(65) Prior Publication Data
US 2022/0090125 A1 Mar. 24, 2022

Related U.S. Application Data

(60) Provisional application No. 62/783,807, filed on Dec. 21, 2018.

(51) Int. Cl.
*C12N 15/85* (2006.01)
*A01K 67/0275* (2024.01)

(52) U.S. Cl.
CPC ...... *C12N 15/8509* (2013.01); *A01K 67/0275* (2013.01); *A01K 2217/00* (2013.01);
(Continued)

(58) Field of Classification Search
CPC ........ C12N 15/8509; C12N 2015/8518; A01K 67/0275; A01K 2217/00; A01K 2227/105;
(Continued)

(56) References Cited

FOREIGN PATENT DOCUMENTS

| EP | 2147594 A1 † | 1/2010 |
|---|---|---|
| EP | 2147597 | 1/2010 |

(Continued)

OTHER PUBLICATIONS

Jackson Laboratory Webpage webpage "The Cre-lox and FLP-FRT systems" (www.jax.org/news-and-insights/2006/may/the-cre-lox-and-flp-frt-systems) (Published May 19, 2006). (Year: 2006).*

(Continued)

*Primary Examiner* — Tracy Vivlemore
*Assistant Examiner* — Thomas R. Amick
(74) *Attorney, Agent, or Firm* — Brownstein Hyatt Farber & Schreck, LLP

(57) ABSTRACT

The present disclosure relates to a transgenic non-human mammal (e.g., mouse) that expresses a common light chain, wherein the transgenic non-human mammal comprises a hybrid light chain locus from which a light chain having a human Vκ joined to a mouse Jκ is expressed. Also provided are methods of making a transgenic non-human mammal capable of expressing a common light chain.

26 Claims, 23 Drawing Sheets

Specification includes a Sequence Listing.

(52) U.S. Cl.
CPC .... *A01K 2227/105* (2013.01); *A01K 2267/01* (2013.01); *C12N 2015/8518* (2013.01)

(58) Field of Classification Search
CPC .......... A01K 2267/01; A01K 2217/072; A01K 2217/075; A01K 2217/15; A01K 67/0278; C07K 16/3092; C07K 16/2803; C07K 16/00; C07K 2317/14; C07K 2317/21; C07K 2317/24; C07K 2317/515; C07K 2317/92
See application file for complete search history.

(56) References Cited

FOREIGN PATENT DOCUMENTS

| WO | 2011/097603 | A1 | † | 8/2011 |
|---|---|---|---|---|
| WO | 2011097603 | | | 8/2011 |
| WO | 2014/160202 | A1 | † | 10/2014 |
| WO | 2014160202 | | | 10/2014 |
| WO | 2015/042250 | A1 | † | 3/2015 |
| WO | 2015042250 | | | 3/2015 |
| WO | 2016/149678 | A1 | † | 9/2016 |
| WO | 2016149678 | | | 9/2016 |
| WO | 2017035274 | | | 3/2017 |
| WO | 2017072208 | | | 5/2017 |

OTHER PUBLICATIONS

International Search Report and Written Opinion for correspondence PCT Application No. PCT/US2019/068039 entitled "Transgenic Mouse Expressing Common Human Light Chain" dated May 13, 2020.
Pelanda, Roberta et al. "A prematurely expressed Ig(kappa) transgene, but not V(kappa)J(kappa) gene segment targeted into the Ig(kappa) locus, can rescue B cell development in lambda5-deficient mice", Immunity, vol. 5, 229-239, 1996.
Hieter, Philip A. et al. "Evolution of Human Immunoglobulin K J Region Genes" The Journal of Biological Chemistry, vol. 257, No. 3, pp. 1516-1522, 1982.
Krah, Simon et al. "Engineering Bispecific Antibodies With Defined Chain Pairing" New Biotechnology, 39 (2017), 167-173.
Bruggemann, Marianne et al. "Human Antibody Production in Transgenic Animals", Arch. Immunol. Ther. Exp. (2015) 63:101-108.
PCT Notification of Third Party Observations dated Dec. 18, 2020.
Extract from MRC Centre for Protein Engineering V Base 1997.
Zhao et al. "Stabilization of the Single-Chain Fragment Variable by an Interdomain Disulfide Bond and Its Effect on Antibody Affinity" International Journal of Molecular Sciences, Jan. 2011.
Sequence alignment of amino acid sequence encoded by the mouse immunoglobulin J kappa 2 gene segment with amino acid sequence encoded by the human immunoglobulin J kappa 2 gene segment.
Examination Report received in European Application No. 19845792.1, dated Jan. 9, 2025, 3 pages.
Lefranc, Marie-Paule and Gérard. The Immunoglobulin Facts Book. 1st Ed. London: Academic Press, 2001, pp. 1-16 and 248 and Appendix A.†

\* cited by examiner
† cited by third party

| Capture Kinetics | | | |
|---|---|---|---|
| PID | $K_e$ (M-1 s-1) | $K_d$ (s-1) | $K_D$ (M) |
| Isotype | N.B. | N.B. | N.B. |
| Pos control | 9.20E+04 | 1.40E-04 | 1.60E-09 |
| PID-9724-01A | 1.90E+04 | 3.90E-04 | 2.10E-08 |
| PID-9726-01A | 7.10E+04 | 2.40E-04 | 3.50E-09 |
| PID-9727-01A | 5.10E+04 | 4.50E-04 | 8.90E-09 |
| PID-9728-01A | 2.40E+04 | 9.10E-04 | 3.90E-08 |
| PID-9729-01A | 2.60E+04 | 6.60E-04 | 2.50E-08 |
| PID-9730-01A | 1.50E+05 | 2.00E-04 | 1.40E-09 |
| PID-9755-01A | 1.70E+05 | 2.50E-04 | 1.50E-09 |
| PID-9760-01A | 6.20E+04 | 2.40E-04 | 3.80E-09 |
| PID-9761-01A | 6.30E+04 | 4.20E-04 | 6.70E-09 |
| PID-9762-01A | 4.20E+04 | 9.10E-04 | 2.20E-08 |
| PID-9763-01A | 9.90E+03 | 1.10E-04 | 1.10E-08 |
| PID-9765-01A | 8.60E+04 | 1.70E-04 | 2.00E-09 |
| PID-9768-01A | 4.40E+04 | 7.70E-04 | 1.80E-08 |
| PID-9776-01A | 7.40E+04 | 2.00E-04 | 2.70E-04 |
| PID-9777-01A | 2.20E+04 | 4.70E-04 | 2.10E-08 |
| PID-9779-01A | 2.60E+05 | 3.40E-04 | 1.30E-09 |
| PID-9780-01A | 2.40E+05 | 2.60E-04 | 1.10E-09 |
| PID-9783-01A | 2.60E+04 | 3.90E-04 | 1.50E-08 |
| PID-9784-01A | 1.90E+04 | 2.00E-04 | 1.00E-08 |
| PID-9785-01A | 8.90E+04 | 2.60E-04 | 2.90E-09 |
| PID-9786-01A | 1.90E+05 | 2.10E-04 | 1.10E-09 |
| PID-9787-01A | 1.90E+04 | 5.70E-04 | 3.00E-08 |
| PID-9788-01A | 2.50E+04 | 6.60E-04 | 2.70E-08 |
| PID-9792-01A | 9.70E+03 | 4.60E-04 | 4.70E-08 |

Figure 19

TRANSGENIC MOUSE EXPRESSING COMMON HUMAN LIGHT CHAIN

CROSS REFERENCE TO RELATED APPLICATIONS

This application is a 35 U.S.C. § 371 U.S. National Stage Entry of International Application No. PCT/US2019/068039 filed Dec. 20, 2019, which claims the benefit of priority to U.S. Provisional Patent Application No. 62/783,807, filed Dec. 21, 2018, entitled "TRANSGENIC MOUSE EXPRESSING COMMON HUMAN LIGHT CHAIN", the contents of each of which are herein incorporated by reference in their entirety.

REFERENCE TO SEQUENCE LISTING

The present application is being filed along with a Sequence Listing in electronic format. The Sequence Listing is provided as a file entitled 21831030US371SEQLST.txt, created on Jun. 21, 2021, which is 20,841 bytes in size. The information in the electronic format of the sequence listing is incorporated herein by reference in its entirety.

BACKGROUND

B cells mediate humoral immunity by producing specific antibodies. The basic structural subunit of an antibody (Ab) is an immunoglobulin (Ig) molecule. Ig molecules consist of a complex of two identical heavy (H) and two identical light (L) polypeptide chains. At the amino terminus of each H chain and L chain is a region that varies in amino acid sequence named the variable (V) region. The remaining portion of the H and L chains is relatively constant in amino acid sequence and is named the constant (C) region. In an Ig molecule, the H and L chain V regions (VH and VL) are juxtaposed to form the potential antigen-binding site. The genes that encode H and L chain V regions are assembled somatically from segments of germline DNA during precursor B (pre-B) cell differentiation: V, D and J gene segments for the H chain and V and J gene segments for the L chain.

The majority of approved therapeutic monoclonal antibody (mAb) therapies are complete immunoglobulin (IgG) molecules which comprise a pair of identical H and L polypeptide chains that fold into a complex quaternary Y-shaped structure. However, there is extensive interest in developing therapeutic bispecific antibodies (bsAbs) which are capable of targeting multiple antigens or epitopes present on a cell. However, bispecific antibody production has proven difficult with bsAbs suffering from low production yields and heterogeneity within the bsAb population.

There are two key associations which need to occur in order to produce a homogenous yield of bsAb: (a) correct H chain heterodimerization and (b) correct L chain association. While much progress has been made in addressing correct H chain heterodimerization, the various approaches to random L chain association have been unsuccessful leading to hampered progress in the field of bsAb development.

In one approach, a L chain is selected by surveying usage statistics for all L chain V domains, identifying the most frequently employed L chain in human antibodies, and pairing that L chain in vitro with the two H chains of differing specificity.

In another approach, a L chain is selected by observing L chain sequences in a phage display library (e.g., a phage display library comprising human L chain V region sequences, e.g., a human ScFv library) and selecting the most commonly used L chain V region from the library. The L chain is then tested on the two different H chains of interest.

In another approach, a L chain is selected by assaying a phage display library of L chain variable sequences using the H chain variable sequences of both H chains of interest as probes. A L chain that associates with both H chain variable sequences might be selected as a L chain for the H chains.

In another approach, a candidate L chain is aligned with the H chains' cognate L chains, and modifications are made in the L chain to more closely match sequence characteristics common to the cognate L chains of both H chains. If the chances of immunogenicity need to be minimized, the modifications preferably result in sequences that are present in known human L chain sequences, such that proteolytic processing is unlikely to generate a T cell epitope based on parameters and methods known in the art for assessing the likelihood of immunogenicity (i.e., in silico as well as wet assays).

However, such approaches rely on in vitro methods that assume a number of a priori restraints, e.g., sequence identity, ability to associate with specific pre-selected H chains, etc. There is a need in the art for compositions and methods that do not rely on manipulating in vitro conditions. Moreover, while methods of making human epitope-binding proteins that include a common light chain exist, there is a need in the art for compositions and methods of employing improved biologically sensible approaches.

SUMMARY OF THE DISCLOSURE

The present disclosure is based, in part, on the identification and production of a transgenic mouse that expresses a common light chain that is capable of pairing (associating) with a variety of heavy chains produced by the transgenic mouse in response to antigen challenge. As described herein, the transgenic mouse expresses a common light chain, which is a hybrid light chain comprising a human Vκ segment joined to a mouse Jκ segment, and allows, e.g., proper and/or efficient splicing to the mouse constant region. The transgenic mouse of the present disclosure can be used to, e.g., generate bispecific antibodies owing to the ability of the common light chain to pair with Ig heavy chains having varying antigenic specificity.

Accordingly, in some aspects, the present disclosure provides a transgenic mouse, comprising in its germline a hybrid variable immunoglobulin (Ig) light chain locus comprising a human light chain Ig V kappa (Vκ) gene segment operably linked to a mouse light chain Ig J kappa (Jκ) gene segment. In some embodiments, the human light chain Ig Vκ gene segment comprises Vκ1-39 or Vκ3-15. In some embodiments, the hybrid variable Ig light chain locus is at an endogenous mouse Ig light chain locus. In some embodiments, the hybrid variable Ig light chain locus replaces an endogenous murine Jκ locus. In some embodiments, the endogenous murine Vκ locus is not disrupted. That is, the murine Vκ locus is left intact. In some embodiments, the transgenic mouse comprises an endogenous (undisrupted) heavy chain locus.

In some embodiments, the hybrid variable Ig light chain locus is operably linked to an endogenous mouse Ig light chain constant region gene sequence.

In some embodiments, the mouse light chain Ig Jκ segment that is joined (operably linked) to a human light chain Vκ segment is selected from the group consisting of Jκ1, Jκ2, Jκ3, Jκ4, and R5. In some embodiments, the mouse light chain Ig Jκ segment comprises Jκ2.

In some embodiments, the transgenic mouse expresses a hybrid light chain comprising a human Vκ segment joined to a mouse Jκ segment from the hybrid variable Ig light chain locus in response to antigen challenge.

In some embodiments, the hybrid light chain is capable of pairing with an Ig heavy chain, e.g., a mouse, humanized, or human heavy chain.

In some embodiments, the human light chain Ig Vκ gene segment encodes a light chain Ig Vκ segment comprising the amino acid sequence SEQ ID NO: 1. In some embodiments, the human light chain Ig Vκ gene segment encodes a light chain Ig Vκ segment comprising the amino acid sequence SEQ ID NO: 2.

In some embodiments, expression from the hybrid variable Ig light chain locus is under the control of a promoter selected from the group consisting of CD19, CD20, µHC, VpreB1, VpreB2, VpreB3, λ5, Igα, Igβ, κLC, λLC, BSAP (Pax5), and IGKV3-15. In some embodiments, expression from the hybrid variable Ig light chain locus is under the control of a human IGKV3-15 promoter.

In some embodiments, the hybrid variable light chain locus further comprises, at 5' of the human light chain Ig Vκ gene segment: a lox p sequence, an IGKV3-15 promoter, and a human or a mouse leader sequence. In some embodiments, the hybrid variable light chain locus further comprises an intron sequence. In some embodiments, the leader sequence is a native human leader sequence that corresponds to the Vκ gene (e.g., Vκ1-39 or Vκ3-15). In some embodiments, the lox p sequence, the IGKV3-15 promoter, the human leader sequence, the intron sequence, the Vκ gene segment (e.g., Vκ1-39 or Vκ3-15), and mouse Jκ (e.g., Jκ2) gene segment are operably linked.

In some embodiments, the human light chain Ig Vκ gene segment and mouse light chain Ig Jκ gene segment does not undergo rearrangement. That is, the human light chain Ig Vκ gene segment and mouse light chain Ig Jκ gene segment are precombined (or prearranged) such that rearrangement does not occur.

In some aspects, the present disclosure provides a transgenic mouse, comprising in its germline a hybrid variable immunoglobulin (Ig) light chain locus comprising a human light chain Ig V kappa (Vκ) gene segment operably linked to a mouse light chain Ig J kappa (Jκ) gene segment, wherein a hybrid variable Ig light chain transgene is inserted by site-specific integration. The site-specific integration of the transgene replaces an endogenous murine Ig Jκ locus. The hybrid variable Ig light chain locus (the integrated transgene) is operatively linked to an endogenous mouse light chain constant region gene segment.

In some embodiments, the human light chain Ig Vκ gene segment comprises Vκ1-39 or Vκ3-15. In some embodiments, the mouse light chain Ig Jκ segment is selected from the group consisting of Jκ1, Jκ2, Jκ3, Jκ4, and Jκ5. In some embodiments, the mouse light chain Ig Jκ segment comprises Jκ2.

In some embodiments, the endogenous murine Vκ locus is not disrupted. In some embodiments, the transgenic mouse comprises an endogenous heavy chain locus. That is, the murine Vκ locus is left intact. In some embodiments, the transgenic mouse comprises an endogenous (undisrupted) heavy chain locus.

In some embodiments, the transgenic mouse expresses a hybrid light chain comprising a human Vκ segment joined to a mouse Jκ segment from the hybrid variable Ig light chain locus in response to antigen challenge.

In some embodiments, the hybrid light chain is capable of pairing with an Ig heavy chain, e.g., a mouse, humanized, or human heavy chain.

In some embodiments, the human light chain Ig Vκ gene segment encodes a Vκ segment comprising the amino acid sequence SEQ ID NO: 1. In some embodiments, the human light chain Ig Vκ gene segment encodes a Vκ segment comprising the amino acid sequence SEQ ID NO: 2.

In some embodiments, expression (of the hybrid light chain) from the hybrid variable Ig light chain locus is under the control of a promoter selected from the group consisting of CD19, CD20, µHC, VpreB1, VpreB2, VpreB3, λ5, Igα, Igβ, κLC, λLC, BSAP (Pax5), and IGKV3-15. In some embodiments, expression from the hybrid variable Ig light chain locus is under the control of a human IGKV3-15 promoter.

In some embodiments, the hybrid variable light chain locus further comprises, at 5' of the human light chain Ig Vκ gene segment: a lox p sequence, an IGKV3-15 promoter, and a human or a mouse leader sequence. In some embodiments, the hybrid variable light chain locus further comprises an intron sequence. In some embodiments, the leader sequence is a native human leader sequence that corresponds to the Vκ gene (e.g., Vκ1-39 or Vκ3-15). In some embodiments, the lox p sequence, the IGKV3-15 promoter, the human leader sequence, the intron sequence, the Vκ gene segment (e.g., Vκ1-39 or Vκ3-15), and mouse Jκ (e.g., Jκ2) gene segment are operably linked.

In some embodiments, the human light chain Ig Vκ gene segment and mouse light chain Ig Jκ gene segment does not undergo rearrangement. That is, the human light chain Ig Vκ gene segment and mouse light chain Ig Jκ gene segment are precombined (or prearranged) such that rearrangement does not occur.

In some embodiments, the hybrid variable light chain transgene is inserted by site-specific integration using a gene editing system selected from the group consisting of: a clustered regularly interspaced short palindromic repeats (CRISPR/Cas9) system, a transcriptional activator-like effector nuclease (TALEN), a zinc finger nuclease (ZFN), a meganuclease, a recombinase, a flippase, a transposase, and an Argonaute protein.

In some aspects, the present disclosure provides a method for making an antibody comprising a human κ variable domain (or Vκ segment), comprising a) exposing the transgenic mouse described herein to an antigen, and b) allowing the transgenic mouse to develop an immune response to the antigen. The method further comprises isolating from the mouse of (b) an antibody that specifically binds to the antigen, wherein the antibody comprises a human κ variable domain.

In some aspects, the present disclosure provides a transgene comprising, in a 5' to 3' direction, a lox p sequence, an IGKV3-15 promoter, a human or mouse leader, and a human light chain Ig Vκ gene segment operably linked to a mouse light chain Ig Jκ segment. In some embodiments, the transgene further comprises an intron sequence. In some embodiments, the leader sequence is a native human leader sequence that corresponds to the Vκ gene (e.g., Vκ1-39 or Vκ3-15). In some embodiments, the lox p sequence, the IGKV3-15 promoter, the human leader sequence, the intron sequence, the Vκ gene segment (e.g., Vκ1-39 or Vκ3-15), and mouse Jκ (e.g., Jκ2) gene segment are operably linked. In some embodiments, the human light chain Ig Vκ gene segment comprises Vκ1-39 or Vκ3-15. In some embodiments, the mouse light chain Ig Jκ segment is selected from the group consisting of Jκ1, Jκ2, Jκ3, Jκ4, and Jκ5. In some embodiments, the mouse light chain Ig Jκ segment comprises Jκ2.

In some aspects, the present disclosure provides a vector comprising a transgene as described herein.

In some aspects, the present disclosure provides a method for producing a cell that expresses an antibody comprising a human κ variable domain, comprising (a) exposing a transgenic mouse described herein an antigen, and (b) allowing the transgenic mouse to develop an immune response to the antigen. The method further comprises isolating from the mouse of (b) a cell that expresses an antibody specific for the antigen (or that specifically binds to the antigen), wherein the antibody comprises a human κ variable domain. In some embodiments, the cell is a B cell.

In some embodiments, the disclosure provides for a method for making a library comprising a plurality of antibodies comprising a single human κ variable domain, the method comprising the steps of: (a) exposing the transgenic mouse of any one of claims 1-26 to a target antigen; (b) amplifying from the mouse of (a) a plurality of heavy chain variable region antibody sequences that specifically binds to the antigen, and (c) expressing the plurality of heavy chain variable region antibody sequences in a corresponding plurality of acceptor cells expressing a human κ variable domain, thereby generating a library comprising a plurality of antibodies comprising a single human κ variable domain. In some embodiments, the method further comprises a step where nucleotide sequences encoding each of the heavy chain variable region antibody sequences in the plurality of sequences from (b) are cloned into a plurality of display vectors. In some embodiments, the display vector is a mammalian display vector. In some embodiments, the vector further comprises a nucleotide sequence encoding Vκ1-39 in frame with a human Kappa constant nucleotide sequence. In some embodiments, the vector further comprises a nucleotide sequence encoding Vκ3-15 in frame with a human Kappa constant nucleotide sequence. In some embodiments, the acceptor cells are mammalian cells. In some embodiments, the acceptor cells are human cells. In some embodiments, the acceptor cells are HEK-293 cells, or a derivative thereof. In some embodiments, the acceptor cells of (d) express the antibodies on the surface of the cells. In some embodiments, the method further comprises the step of: (d) selecting acceptor cells expressing antibodies with higher binding to the target antigen relative to other acceptor cells in the library. In some embodiments, the method further comprises the step of: (e) determining the nucleotide sequences encoding the variable heavy chains of the antibodies expressed by the selected acceptor cells. In some embodiments, the method further comprises the step of: (e) determining the nucleotide sequences encoding the variable light chains of the antibodies expressed by the selected acceptor cells. In some embodiments, the method further comprises the step of: (f) determining the nucleotide sequences encoding the variable heavy chains and the variable light chains of the antibodies expressed by the selected acceptor cells.

BRIEF DESCRIPTION OF THE DRAWINGS

FIG. 19 provides kinetic data for 24 antibodies identified as having monovalent $K_D$ values less than 100 nM that were generated as part of the immune library from hIGKVK3-15/mIGKJ2 and hIGKVK1-39/mIGKJ2 mice described in Example 4.

DETAILED DESCRIPTION

Figure 1:
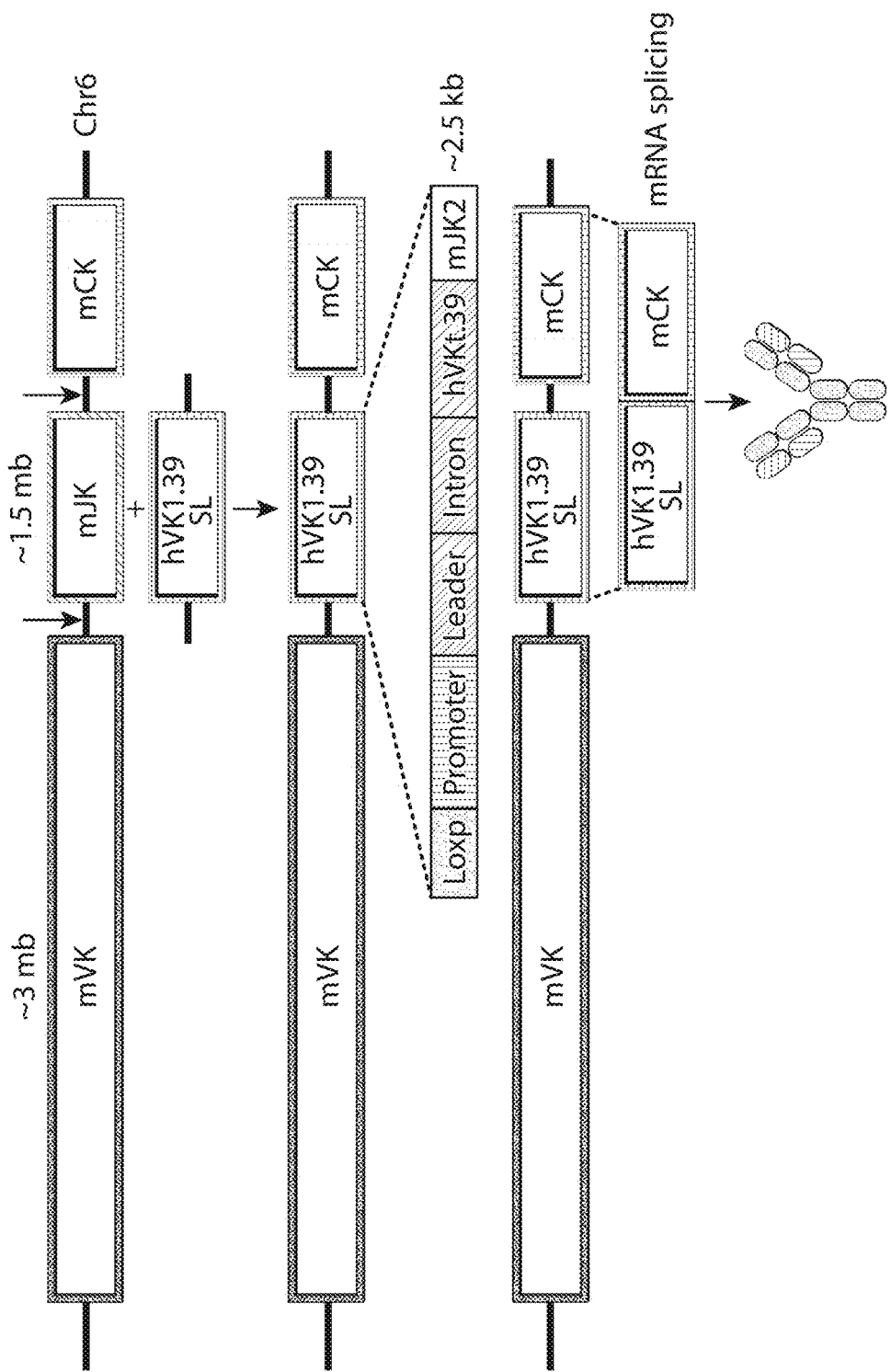
FIG. 1 shows a schematic of the mouse light chain Ig locus. The figure illustrates the replacement of the mouse Jκ segments with a human Vκ1.39 gene segment, wherein the Vκ1.39 single light chain (SL) is further identified as including: loxp, promoter, leader, intron, hVκ1.39, and mouse Jκ2.

Unless otherwise defined, all terms of art, notations and other scientific terminology used herein are intended to have the meanings commonly understood by those of skill in the art to which this disclosure pertains. In some cases, terms with commonly understood meanings are defined herein for clarity and/or for ready reference, and the inclusion of such definitions herein should not necessarily be construed to represent a difference over what is generally understood in the art. The techniques and procedures described or referenced herein are generally well understood and commonly employed using conventional methodologies by those skilled in the art, such as, for example, the widely utilized molecular cloning methodologies described in Sambrook et al., *Molecular Cloning: A Laboratory Manual* 2nd ed. (1989) Cold Spring Harbor Laboratory Press, Cold Spring Harbor, N.Y. As appropriate, procedures involving the use of commercially available kits and reagents are generally carried out in accordance with manufacturer defined protocols and/or parameters unless otherwise noted.

As used herein, the singular forms "a," "an," and "the" include the plural referents unless the context clearly indicates otherwise.

In the specification and claims, the term "about" is used to modify, for example, the quantity of an ingredient in a composition, concentration, volume, process temperature, process time, yield, flow rate, pressure, and like values, and ranges thereof, employed in describing the embodiments of the disclosure. The term "about" refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. If there are uses of the term which are not clear to persons of ordinary skill given the context in which it is used, "about" will mean up to plus or minus 10% of the particular value.

The term "antibody" describes a type of immunoglobulin molecule and is used herein in its broadest sense. An antibody specifically includes intact antibodies (e.g., intact immunoglobulins), and antibody fragments such as antigen-binding fragments of an antibody, as described herein. Thus, "antibody" can refer to an intact antibody as well as an antigen-binding fragment thereof. Antibodies comprise at least one antigen-binding domain. One example of an antigen-binding domain is an antigen binding domain formed by a $V_H$-$V_L$ dimer. Antibodies can be described by the antigen to which they specifically bind.

The $V_H$ and $V_L$ regions can be further subdivided into regions of hypervariability ("hypervariable regions (HVRs);" also called "complementarity determining regions" (CDRs)) interspersed with regions that are more conserved. The more conserved regions are called framework regions (FRs). Each $V_H$ and $V_L$ generally comprises three CDRs and four FRs, arranged in the following order (from N-terminus to C-terminus): FR1-CDR1-FR2-CDR2-FR3-CDR3-FR4. The CDRs are involved in antigen binding, and confer antigen specificity and binding affinity to the antibody. See Rabat et al., *Sequences of Proteins of Immunological Interest* 5th ed. (1991) Public Health Service, National Institutes of Health, Bethesda, Md., incorporated by reference in its entirety.

The light chain from vertebrate species can be assigned to one of two types, called kappa and lambda, based on the sequence of the constant domain.

The heavy chain from vertebrate species can be assigned to one of five different classes (or isotypes): IgA, IgD, IgE, IgG, and IgM. These classes are also designated α, δ, ε, γ, and μ, respectively. The IgG and IgA classes are further divided into subclasses on the basis of differences in sequence and function. Humans express the following subclasses: IgG1, IgG2, IgG3, IgG4, IgA1, and IgA2.

Methods of generating and screening for an antibody against a desired target is well-known in the art. Methods of further modifying antibodies for enhanced properties (e.g., enhanced affinity, chimerization, humanization) as well as generating antigen-binding fragments, as described herein, are also well-known in the art.

The term "chimeric antibody" refers to an antibody in which a component of the heavy and/or light chain is derived from a particular source or species, while the remainder of the heavy and/or light chain is derived from a different source or species.

"Humanized" forms of non-human antibodies are chimeric antibodies that contain minimal sequence derived from the non-human antibody. A humanized antibody is generally a human immunoglobulin (recipient antibody) in which residues from one or more CDRs are replaced by residues from one or more CDRs of a non-human antibody (donor antibody).

The donor antibody can be any suitable non-human antibody, such as a mouse, rat, rabbit, chicken, or non-human primate antibody having a desired specificity, affinity, or biological effect. In some instances, selected framework region residues of the recipient antibody are replaced by the corresponding framework region residues from the donor antibody. Humanized antibodies can also comprise residues that are not found in either the recipient antibody or the donor antibody. Such modifications can be made to further refine antibody function. For further details, see Jones et al., (1986) *Nature,* 321:522-525; Riechmann et al., (1988) *Nature,* 332:323-329; and Presta, (1992) *Curr. Op. Struct. Biol.,* 2:593-596, each of which is incorporated by reference in its entirety.

A "human antibody" is one which possesses an amino acid sequence corresponding to that of an antibody produced by a human or a human cell, or derived from a non-human source that utilizes a human antibody repertoire or human antibody-encoding sequences (e.g., obtained from human sources or designed de novo). Human antibodies specifically exclude humanized antibodies.

With regard to the binding of an antigen-binding protein/region/arm to a target molecule, the terms "specific binding," "specifically binds to," "specific for," "selectively binds," and "selective for" a particular antigen (e.g., a polypeptide target) or an epitope on a particular antigen mean binding that is measurably different from a non-specific or non-selective interaction. Specific binding can be measured, for example, by determining binding of a molecule compared to binding of a control molecule. Specific binding can also be determined by competition with a control molecule that is similar to the target, such as an excess of non-labeled target. In that case, specific binding is indicated if the binding of the labeled target to a probe is competitively inhibited by the excess non-labeled target.

The term "epitope" means a component of an antigen capable of specific binding to an antigen-binding protein. Epitopes frequently consist of surface-accessible amino acid residues and/or sugar side chains and can have specific three-dimensional structural characteristics, as well as specific charge characteristics. Conformational and non-conformational epitopes are distinguished in that the binding to the former but not the latter is lost in the presence of denaturing solvents. An epitope can comprise amino acid residues that are directly involved in the binding, and other amino acid residues, which are not directly involved in the binding. The epitope to which an antigen-binding protein binds can be determined using known techniques for epitope determination such as, for example, testing for antigen-binding protein binding to antigen variants with different point-mutations.

The term "transgene" as used herein refers to a gene that is introduced as an exogenous source to a site within a host genome (e.g., mouse light chain Ig locus). A polypeptide expressed from such transgene is referred to as a "hybrid" polypeptide (or "hybrid" Ig light chain) or "heterologous" polypeptide. The transgene can be naturally-occurring or engineered, and can be wild type or a variant. The transgene may include nucleotide sequences other than the sequence (or gene segment) that encodes the hybrid or heterologous polypeptide. For example, the transgene further comprises promoter/regulatory sequences operably linked to a sequence that encodes the hybrid or heterologous polypeptide. "Exogenous gene" and "transgene" are sometimes used interchangeably.

The term "transgenic mouse" as used herein refers to a mouse comprising cells having a transgene, as defined herein. The transgene may be present in all or some cells of the mouse. The term "transgenic mouse" encompasses an engineered mouse generated by various methods known in the art. For example, by inserting a transgene into a fertilized oocyte or cells from the early embryo, the resulting transgenic mouse may be fully transgenic and able to transmit the transgene stably in its germline. Alternatively, a transgene may be introduced by transferring, e.g., implanting, a recombinant cell or tissue containing the same into a mouse to produce a partially transgenic mouse. Alternatively, a transgenic mouse may be produced by transfer of a nucleus from a genetically modified somatic cell or by transfer of a genetically modified pluripotential cell such as an embryonic stem cell or a primordial germ cell. A chimeric mouse may have cells donated by another animal in the germline, in which case the progeny of the mouse may be heterozygous for chromosomes in the donated cells. If the donated cells contain a transgene, the progeny of the chimeric mouse may be "transgenic", where a "transgenic" mouse is a mouse made up cells containing an exogenous gene.

The term "operably linked" as used herein refers to the placement or positioning of one functional nucleic acid sequence with another functional nucleic acid sequence such that the positional relationship confers a functional benefit. Such sequences include both expression control sequences that are contiguous with a nucleic acid that encodes a polypeptide and expression control sequences that act in trans or at a distance to control a nucleic acid that encodes a polypeptide. By way of example, a promoter operably linked to the coding region of a gene is able to promote transcription of the coding region. By way of another example, a human Vκ segment operably linked to a mouse Jκ segment refers to the joining of the human and mouse segments to form a functional unit.

The term "in-frame" means that a nucleotide sequence is arranged such that the sequence or collection of sequences does not contain any non-overlapping nucleotide triplets (e.g., codons). An in-frame nucleotide sequence is biologically relevant, e.g., it has the potential to be transcribed into RNA and translated into a polypeptide. In some instances, more than one nucleotide sequence may be joined together such that they are "in-frame" and encode a single polypeptide.

As used herein, "hybrid variable Ig light chain locus" or "hybrid light chain locus" refers to a variable light chain locus that comprises light chain coding sequences derived from human and murine origins (e.g., human Vκ and mouse Jκ). Expression from the hybrid light chain locus produces a hybrid light chain (e.g., human Vκ segment joined to mouse Jκ segment). The hybrid light chain refers to the common light chain as described herein.

As used herein, "V kappa (Vκ) gene segment" includes all human Vκ gene segments known in the art, including, e.g., IGKV1-5, IGKV1-6, IGKV1-8, IGKV1-9, IGKV1-12, IGKV1-13, IGKV1-16, IGKV1-17, IGKV1-22, IGKV1-27, IGKV1-32, IGKV1-33, IGKV1-35, IGKV1-37, IGKV1-39, IGKV2-4, IGKV2-10, IGKV2-14, IGKV2-18, IGKV2-19, IGKV2-23, IGKV2-24, IGKV2-26, IGKV2-28, IGKV2-29, IGKV2-30, IGKV2-36, IGKV2-38, IGKV2-40, IGKV3-7, IGKV3-11, IGKV3-15, IGKV3-20, IGKV3-25, IGKV3-31, IGKV3-34, IGKV4-1, IGKV5-2, IGKV6-21, IGKV7-3. Vκ gene segments, as used herein, also encompass functional modifications of the known sequences.

As used herein, "J kappa (Jκ) gene segment" includes include all known mouse Jκ gene segments, including IGKJ1, IGKJ2, IGKJ3, IGKJ4, IGKJ5. Jκ gene segments, as used herein, also encompass functional modifications of the known sequences.

As used herein, "common light-chain" or "common immunoglobulin light-chain" or "single light chain" or "hybrid variable Ig light chain" refers to a light chain variable region that can pair with multiple heavy chain variable regions to produce antibodies that bind to different antigens. The common light chain is a passive partner for antigen binding, and antigen binding is determined by the heavy chains. For example, bi-specific antibodies have two binding specificities and, in some cases, both arms of a bi-specific antibody have the same light-chain (i.e., a "common" light chain) and different heavy chains (which largely determine the binding specificity of the arm).

As used herein, "joined to" refers to the combination or attachment of two or more elements, components, or protein domains, e.g., polypeptides, by means including chemical conjugation, recombinant means, and chemical bonds, e.g., disulfide bonds and amide bonds. For example, two single polypeptides can be joined to form one contiguous protein structure through chemical conjugation, a chemical bond, a peptide linker, or any other means of covalent linkage.

As used herein, "capable of pairing" refers to the interaction, e.g., hydrogen bonding, hydrophobic interaction, or ionic interaction, between polypeptides. For example, two polypeptides, in which one polypeptide comprises the variable heavy chain domain and the other comprises the variable light chain domain, can associate to form the antigen-binding (Fab) fragment.

As used herein, "promoter" refers to a nucleic acid sequence which is required for expression of a gene product operably linked to the promoter/regulator sequence. In some embodiments, this sequence may be the core promoter sequence. In some embodiments, this sequence may also include an enhancer sequence and other regulatory element(s) required for expression of the gene product.

As used herein, "leader sequence" refers to a DNA molecule isolated from the untranslated 5' region (5' UTR) of a genomic copy of a gene and is defined generally as a nucleotide segment between the transcription start site (TSS) and the protein coding sequence start site. In some embodiments, leaders can be synthetically produced or manipulated DNA elements. A leader can be used as a 5' regulatory element for modulating expression of an operably linked transcribable polynucleotide molecule.

As used herein, "germline" refers to an immunoglobulin nucleic acid sequence in a non-somatically mutated cell, e.g., a non-somatically mutated B cell or pre-B cell or hematopoietic cell.

As used herein, "hybridoma" refers to a cell or progeny of a cell resulting from fusion of an immortalized cell and an antibody-producing cell. The resulting hybridoma is an immortalized cell that produces antibodies. The individual cells used to create the hybridoma can be from any mammalian source, including, but not limited to, hamster, rat, pig, rabbit, sheep, goat, and human. The term also encompasses trioma cell lines, which result when progeny of heterohybrid myeloma fusions, which are the product of a fusion between human cells and a murine myeloma cell line, are subsequently fused with a plasma cell. The term includes any immortalized hybrid cell line that produces antibodies such as, for example, quadromas.

Percent "identity" between a polypeptide sequence and a reference sequence, is defined as the percentage of amino acid residues in the polypeptide sequence that are identical to the amino acid residues in the reference sequence, after aligning the sequences and introducing gaps, if necessary, to achieve the maximum percent sequence identity. Alignment for purposes of determining percent amino acid sequence identity can be achieved in various ways that are within the skill in the art, for instance, using publicly available computer software such as BLAST, BLAST-2, ALIGN, MEGALIGN (DNASTAR), CLUSTALW, or CLUSTAL OMEGA software. In some embodiments, alignment is performed using the CLUSTAL OMEGA software. Those skilled in the art can determine appropriate parameters for aligning sequences, including any algorithms needed to achieve maximal alignment over the full length of the sequences being compared.

A "conservative substitution" or a "conservative amino acid substitution," refers to the substitution of one or more amino acids with one or more chemically or functionally similar amino acids. Conservative substitution tables providing similar amino acids are well known in the art. Polypeptide sequences having such substitutions are known as "conservatively modified variants," or "variants." Such conservatively modified variants are in addition to and do not exclude polymorphic variants, interspecies homologs, and alleles. Some examples of conservative substitutions can be found, for example, in Creighton, *Proteins: Structures and Molecular Properties* 2nd ed. (1993) W. H. Freeman & Co., New York, N.Y.

A polypeptide or immunoglobulin disclosed herein can comprise an amino acid sequence which is not naturally occurring. Such variants necessarily have less than 100% sequence identity or similarity with the starting molecule. In certain embodiments, the variant will have an amino acid sequence from about 75% to less than 100% amino acid sequence identity or similarity with the amino acid sequence of the starting (e.g. naturally-occurring or wild-type) polypeptide, more preferably from about 80% to less than 100%, more preferably from about 85% to less than 100%, more preferably from about 90% to less than 100% (e.g., 91%, 92%, 93%, 94%, 95%, 96%, 97%, 98%, 99%) and most preferably from about 95% to less than 100%, e.g., over the length of the variant molecule.

Preferred methods and materials are described herein, although methods and materials similar or equivalent to those described herein can also be used in the practice or testing of the presently disclosed methods and compositions. All publications, patent applications, patents, and other references mentioned herein are incorporated by reference in their entirety.

Various aspects of the invention are described in further detail below. Additional definitions are set out throughout the specification.

Common Light Chain-Producing Transgenic Animal

The present disclosure provides for a transgenic animal (e.g., mouse) capable of producing antibodies having a common human light chain. Prior efforts to make useful multispecific epitope-binding proteins, e.g., bispecific antibodies, have been hindered by a variety of problems that frequently share a common paradigm: in vitro selection or manipulation of sequences to rationally engineer, or to engineer through trial-and-error, a suitable format for pairing a heterodimeric bispecific human immunoglobulin. Unfortunately, most if not all of the m vitro engineering approaches provide largely ad hoc fixes that are suitable, if at all, for individual molecules. On the other hand, in vivo methods for employing complex organisms to select appropriate pairings that are capable of leading to human therapeutics have not been realized.

A mouse that selects a common light chain for a plurality of heavy chains has a practical utility. In various embodiments, a mouse that can only express a common tight chain will have heavy chains that can associate and express with an identical or substantially identical light chain. This is particularly useful in making bispecific antibodies. For example, such a mouse can be immunized with a first antigen (immunogen) to generate a B cell that expresses an antibody that specifically binds a first epitope. The mouse (or a mouse genetically the same) can be immunized with a second antigen to generate a B cell that expresses an antibody that specifically binds the second epitope. Variable heavy regions can be cloned from the B cells and expressed with the same heavy chain constant region, and the same light chain, and expressed in a cell to make a bispecific antibody, wherein the light chain component of the bispecific antibody has been selected by a mouse to associate (or pair) and express with the heavy chain component.

As described above, to produce a bispecific antibody, it is advantageous if the light chain is common to both branches of the antibody molecule, with the binding specificity determined largely (or solely) by the heavy chain. The light chain provides the proper structure for assembly of the full antibody molecule, but acts as a passive partner for antigen binding. Expression of the bispecific is thus simplified because only two heavy chains and one common light chain are required.

During normal B cell development, light chain genes undergo mutational processes to produce a diverse repertoire of sequences, and further diversification and selection during an immune response to refine and improve antigen binding. The common light chain approach generally avoids such mutations so that the light chain remains unchanged in B cells. One of the drivers of diversity is the process of gene rearrangement in which one of the various V regions combines with one of the various J regions in an imprecise process which produces variation at the V-J junction, forming the CDR3 loop. In general, the common light chain approach bypasses this step and expresses a pre-rearranged variable region with the same sequence in all B cells.

The present disclosure provides a transgenic mouse for generating immunoglobulin light chains that will suitably pair with a rather diverse family of heavy chains, including heavy chains whose variable regions depart from germline sequences, e.g., affinity matured or somatically mutated variable regions. In some embodiments, the mouse is engineered to pair human light chain variable domains with murine heavy chain variable domains that comprise somatic mutations, thus enabling a route to high affinity binding proteins suitable for use as therapeutics.

The transgenic mouse, through the known process of antibody selection within an organism, makes biologically appropriate choices in pairing a diverse collection of murine heavy chain variable domains with a limited number of human light chain options. In order to achieve this, the mouse is engineered to present a limited number of human light chain variable domain options (or a single common light chain) in conjunction with a wide diversity of murine heavy chain variable domain options. Upon challenge with an antigen, the mouse maximizes the number of solutions in its repertoire to develop an antibody to the antigen, limited largely or solely by the number or light chain option(s) in its repertoire. In some embodiments, this includes allowing the mouse to achieve suitable and compatible somatic mutations of the light chain variable domain that will nonetheless be compatible with a relatively large variety of murine heavy chain variable domains, including in particular somatically mutated murine heavy chain variable domains.

To achieve a limited repertoire of light chain options, the mouse is engineered to render nonfunctional or substantially nonfunctional its ability to make, or rearrange, a native mouse light chain variable domain. This can be achieved, e.g., by deleting all or a portion of the mouse's light chain J region gene segments (e.g., mouse Jκ). The endogenous mouse locus can then be modified by an exogenous suitable human light chain variable region gene segment of choice, (e.g., a Vκ segment) operably linked to the endogenous mouse light chain constant domain, in a manner such that the exogenous human variable region gene segments can rearrange and recombine with the endogenous mouse light chain constant region gene and form a rearranged reverse chimeric light chain gene (human variable, mouse constant). In some embodiments, the light chain variable region is capable of being somatically mutated. In some embodiments, the exogenous human light chain variable region gene segment of choice (e.g., a Vκ segment) is precombined (prerearranged) with a mouse light chain J region gene segment (e.g., mouse Jκ2) such that the exogenous gene is not capable of being somatically mutated. In some embodiments, to maximize ability of the light chain variable region to acquire somatic mutations, the appropriate enhancer(s) is retained in the mouse.

A transgenic mouse is provided that expresses a limited repertoire of reverse chimeric (human variable, mouse constant) light chains associated with a diversity of endogenous murine heavy chains. In various embodiments, the endogenous mouse κ light chain variable region gene segments are rendered nonfunctional. For example, the endogenous mouse Vκ gene segments can be rendered unable to functionally splice with the mouse Jκ segments by, e.g., removing some or all of the mouse J segments and associated splice acceptor sites and replaced with a pre-recombined human Vκ/mouse Jκ sequence, as demonstrated herein.

A transgenic mouse is provided that, in some embodiments, comprises a light chain variable region locus lacking an endogenous mouse light chain J gene segment and comprising a hybrid variable gene segment. In some embodiments, the hybrid variable gene segment comprises a rearranged (precombined) human Vκ sequence and a murine Jκ sequence. This hybrid variable gene segment (the transgene) is inserted to be properly linked to a mouse constant region. In some embodiments, the resulting hybrid light chain locus is not capable of undergoing somatic hypermutation.

The transgenic mouse in various embodiments when immunized with an antigen of interest generates B cells that exhibit a diversity of rearrangements of murine immunoglobulin heavy chain variable regions that express and function with one or with two light chains, including embodiments where the one or two light chains comprise hybrid light chain variable regions that comprise, e.g., 0 to 5 somatic mutations. In some embodiments, the hybrid light chains so expressed are capable of associating and expressing with any murine immunoglobulin heavy chain variable region expressed in the mouse. In some embodiments, the hybrid light chains so expressed are capable of associating with any murine immunoglobulin heavy chain variable region expressed in the mouse, as well as modified forms thereof.

As will be appreciated by those of skill in the art, in some embodiments, the animal may be any non-human animal that has a relatively small number of light chain genes, or an animal that employs gene conversion for developing their primary antigen repertoire and, as such, the animal may be any of a variety of different animals. In one embodiment, the animal may be a bird, e.g., a member of the order Galliformes such as a chicken or turkey, or a member of the order Anseriformes such as a duck or goose, or a mammal, e.g., a lagamorph such as rabbit, or a farm animal such as a cow, sheep, pig or goat. In particular embodiments, the transgenic animal may be a rodent (e.g., a mouse or rat), or a non-rodent (e.g., non-mouse or non-rat), non-primate transgenic animal.

The present disclosure relates to a transgenic mice containing one or more transgenes. Since the nucleotide sequences of the immunoglobulin loci of many animals are known, as are methods for modifying the genome of such animals, the general concepts described herein may be readily adapted to any suitable animal, particularly animals that employ gene conversion for developing their primary antigen repertoire. The generation of antibody diversity by gene conversion between the variable region of a transcribed immunoglobulin heavy or light chain gene and operably linked (upstream) pseudo-genes that contain different variable regions is described in a variety of publications such as, for example, Butler (Rev. Sci. Tech. 1998 17: 43-70), Bucchini (Nature 1987 326: 409-11), Knight (Adv. Immunol. 1994 56: 179-218), Langman (Res. Immunol. 1993 144: 422-46), Masteller (Int. Rev. Immunol. 1997 15: 185-206), Reynaud (Cell 1989 59: 171-83) and Ratcliffe (Dev. Comp. Immunol. 2006 30: 101-118).

The above-described transgenic animal can made by known recombinant technology to modify the genome of an animal. Methods for producing transgenic animals, e.g., mice, are known, and, in particular, methods for modifying the genomes of animal that use gene conversion are also known (see, e.g., Sayegh, Vet. Immunol. Immunopathol. 1999 72:31-7 and Kamihira, Adv. Biochem. Eng. Biotechnol. 2004 91: 171-89 for birds, and Bosze, Transgenic Res. 2003 12:541-53 and Fan, Pathol. Int. 1999 49: 583-94 for rabbits and Salamone J. Biotechnol. 2006 124: 469-72 for cow), as is the structure and/or sequence of the germline immunoglobulin heavy and light chain loci of many of those species (e.g., Butler Rev Sci Tech 1998 17:43-70 and Ratcliffe Dev Comp Immunol 2006 30: 101-118), the above-described animal may be made by routine methods given this disclosure.

In some embodiments, present disclosure provides a transgenic mouse that expresses a common light chain that is capable of pairing (associating) with a variety of heavy chains produced by the transgenic mouse in response to antigen challenge. In some embodiments, the common light chain is a hybrid light chain comprising a human Vκ segment joined to a mouse Jκ segment. As described herein, the human Vκ gene segment and mouse Jκ gene segment are operably linked as a pre-rearranged variable region and introduced into the mouse Ig light chain locus by replacing all or a portion of the mouse Jκ gene segments. While the resulting transgenic mouse retains the mouse Vκ gene segments intact (unmodified or undisrupted), the mouse Vκ segments are non-functional, as described above. The transgenic mouse of the present disclosure can be used, e.g., to readily generate bispecific antibodies owing to the ability of the common light chain to pair with Ig heavy chains (e.g., mouse, humanized, or human) having varying antigenic specificity.

In some embodiments, the human light chain Ig Vκ gene segment comprises any of the known human Vκ gene segment, as well as functional variants thereof. Methods of generating a desired variant of a Vκ gene segment is well within the skill set of those in the art. In some embodiments, the Vκ gene segment comprises Vκ1-39 or Vκ3-15, or a variant thereof. The nucleic acid sequence of Vκ1-39 and Vκ3-15 are shown in SEQ ID NO: 3 and 4, respectively.

In some embodiments, the hybrid variable Ig light chain locus is at an endogenous mouse Ig light chain locus. In some embodiments, the hybrid variable Ig light chain locus replaces an endogenous murine Jκ locus. In some embodiments, the hybrid variable Ig light chain locus replaces all or the murine Jκ gene segments. In some embodiments, the hybrid variable Ig light chain locus replaces only some of the murine Jκ gene segments.

As described herein, the endogenous murine light chain locus can be modified in a way that renders the production and/or processing of the endogenous mouse Vκ segment nonfunctional. In some embodiments, the endogenous murine Vκ locus is not disrupted. That is, the murine Vκ locus is left intact, but the expressed Vκ segments are unable to functionally splice with the mouse J segments. In some embodiments, the transgenic mouse comprises an endogenous (undisrupted and unmodified) heavy chain locus.

In some embodiments, the hybrid variable Ig light chain locus is operably linked to an endogenous mouse Ig light chain constant region gene sequence. In some embodiments, the mouse light chain Ig Jκ segment that is joined (operably linked) to a human light chain Vκ segment can be any one or more of Jκ1, Jκ2, Jκ3, Jκ4, and Jκ5. In some embodiments, the mouse light chain Ig Jκ segment that is joined (operably linked) to a human light chain Vκ segment is selected from the group consisting of Jκ1, Jκ2, Jκ3, Jκ4, and Jκ5. In some embodiments, the mouse light chain Ig Jκ segment comprises Jκ2.

In some embodiments, the transgenic mouse expresses a hybrid light chain comprising a human Vκ segment joined to a mouse Jκ segment from the hybrid variable Ig light chain locus in response to antigen challenge. In some embodiments, the hybrid light chain is capable of pairing with an Ig heavy chain, e.g., a mouse, humanized, or human heavy chain.

In some embodiments, the human light chain Ig Vκ gene segment encodes a light chain Ig Vκ segment comprising the amino acid sequence SEQ ID NO: 1. In some embodiments, the human light chain Ig Vκ gene segment encodes a light chain Ig Vκ segment comprising the amino acid sequence SEQ ID NO: 2. In some embodiments, the human light chain Ig Vκ gene segment is encoded by a sequence that is at least 90%, 91%, 92%, 93%, 94%, 95%, 96%, 97%, 98%, 99%, or 100% identical to SEQ ID NO: 3. In some embodiments, the human light chain Ig Vκ gene segment is encoded by a sequence that is at least 90%, 91%, 92%, 93%, 94%, 95%, 96%, 97%, 98%, 99%, or 100% identical to SEQ ID NO: 4.

In some embodiments, expression from the hybrid variable Ig light chain locus is under the control of a suitable promoter known in the art. In some embodiments, the promoter is selected from the group consisting of CD19, CD20, µHC, VpreB1, VpreB2, VpreB3, λ5, Igα, Igβ, κLC, λLC. BSAP (Pax5), and IGKV3-15. In some embodiments, expression from the hybrid variable Ig light chain locus is under the control of a human IGKV3-15 promoter.

In some embodiments, the hybrid variable light chain locus further comprises, at 5' of the human light chain Ig Vκ gene segment: a lox p sequence, an IGKV3-15 promoter, and a human or a mouse leader sequence. In some embodiments, the hybrid variable light chain locus further comprises an intron sequence. In some embodiments, the leader sequence is a native human leader sequence that corresponds to the Vκ gene (e.g., Vκ1-39 or Vκ3-15). In some embodiments, the lox p sequence, the IGKV3-15 promoter, the human leader sequence, the intron sequence, the Vκ gene segment (e.g., Vκ1-39 or Vκ3-15), and mouse Jκ (e.g., Jκ2) gene segment are operably linked.

In some embodiments, the human light chain Ig Vκ gene segment and mouse light chain Ig Jκ gene segment does not undergo rearrangement. That is, the human light chain Ig Vκ gene segment and mouse light chain Ig Jκ gene segment are precombined (or prearranged) such that rearrangement does not occur.

In some aspects, the present disclosure provides a transgenic mouse, comprising in its germline a hybrid variable immunoglobulin (Ig) light chain locus comprising a human light chain Ig V kappa (Vκ) gene segment operably linked to a mouse light chain Ig J kappa (Jκ) gene segment, wherein a hybrid variable Ig light chain transgene is inserted by site-specific integration. The site-specific integration of the transgene replaces an endogenous murine Ig Jκ locus. In some embodiments, the site-specific integration of the transgene replaces all or a portion of the endogenous murine Ig Jκ locus. For example, the site-specific integration of the transgene replaces one or more, a portion thereof, or all of Jκ1, Jκ2, Jκ3, Jκ4, and Jκ5 gene segments. The hybrid variable Ig light chain locus (the integrated transgene) is operatively linked to an endogenous mouse light chain constant region gene segment.

Various methods of modifying the host animal genome for site-specific integration of a desired transgene are known in the art. Such methods include the use of, for example, a clustered regularly interspaced short palindromic repeats (CRISPR/Cas9) system, a transcriptional activator-like effector nuclease (TALEN), a zinc finger nuclease (ZFN), a meganuclease, a recombinase, a flippase, a transposase, and an Argonaute protein. The CRISPR/Cas system, TALEN, and zinc-finger nucleases and uses thereof, are described, e.g., in International Publication WO2015/142675, incorporated by reference herein in its entirety.

Transgene engineering may include one or more of the following features, all of which are known in the art: Selection markers: Bsd, Zeo, Puro, Hyg which may be used in any combination; Negative selectable marker: thymidine kinase (TK). Negative selection may be used in combination with one or more selection markers; Markers and/or vector sequence may be flanked with loxP, variant loxP, Frt or variant Frt sites; Pairs of sites may be identical or non-identical. More than two sites may be used. Further, recombinases (Cre, Fip) can be used to delete, invert or replace sequences. Generation of genomic double stranded break at defined sequences can be achieved using, e.g., Zinc fingers, TALENs, CRISPR, or Mega nucleases (homing endonucleases).

"CRISPR" as used herein refers to a set of clustered regularly interspaced short palindromic repeats, or a system comprising such a set of repeats. "Cas", as used herein, refers to a CRISPR-associated protein. A "CRISPR/Cas" system refers to a system derived from CRISPR and Cas which can be used to modify the murine immunoglobulin light chain locus. Those of skill in the art can readily design and use the CRISPR/Cas system for targeted site-specific integration at a desired location in a mouse Ig light chain locus, as demonstrated herein.

Producing Antibodies from the Transgenic Mouse

The present disclosure provides a method for producing antibodies from the transgenic mice described herein, comprising immunizing the transgenic animal with an antigen and obtaining from the transgenic animal an antibody that comprises a common light-chain (a hybrid light chain as described herein), and which specifically binds to the antigen. The method can further include making hybridomas using cells of the transgenic animal; and screening the hybridomas to identify a hybridoma that produces an antibody that specifically binds to the antigen. Methods for determining that the transgenic mouse produces the desired hybrid light chain are known in the art and exemplified herein.

If the antibodies are polyclonal, the method comprises isolating the antibodies from a bleed from the animal. If the animal is homozygous for the common light chain sequence, then all of the antibodies in the polyclonal antisera should have the same light chain. If monoclonal antibodies are desired, then the method comprises, e.g., making hybridomas using cells of the immunized transgenic animal; screening the hybridomas to identify an antigen-specific hybridoma; and isolating an antigen-specific antibody from the antigen-specific hybridoma.

In certain embodiments, the transgenic mouse can be immunized with any desired antigen, such as a tumor-specific or tumor-associated antigens. Examples of antigens include cancer-testis antigens, differentiation antigens, overexpressed TAAs, tumor-specific antigens, TAAs arising from abnormal post-translational modifications, and onco-viral proteins (see US 20180251519). Some examples of tumor-associated antigens include, e.g., BLTA, CD5, CD31, CD66a, CD72, CD160, CD244 (2B4), CMRF35H, DCIR, EPO-R, FcγRIIb (CD32B), FCRL2, FCRL3, FCRL4, FCRL5, FCRL6, G6B, IL4R, IRTA1, IRTA2, KIR2DL1, KIR2DL2, KIR2DL3, KIR2DL4, KIR2DL5, KIR3DL1, KIR3DL2, LAIR-1, LIR1, LIR2, LIR3, LIR5, LIR8, LAIR-1, LIR8, MAFA, NKG2A, NKp44, NTB-A, PD-1, PECAM-1, PILRα, SPAP1, SPAP2, SIGLEC1, SIGLEC2 (CD22), SIGLEC3 (CD33), SIGLEC4, SIGLEC5, SIGLEC6, SIGLEC7, SIGLEC8, SIGLEC9, SIGLEC10, SIGLEC11, SIRPα2, TIGIT, LAG-3, TIM-3, TIM-4, VISTA, CTLA-4, SIT, CD96, MUC-1, MUC-16, and CD112R or the like in order to produce a therapeutic antibody.

The antigens can be administered to a transgenic host animal in any convenient manner, with or without an adjuvant, and can be administered in accordance with a predetermined schedule.

After immunization, serum or milk from the immunized transgenic animals can be fractionated for the purification of pharmaceutical grade polyclonal antibodies specific for the antigen. In the case of transgenic birds, antibodies can also be made by fractionating egg yolks. A concentrated, purified immunoglobulin fraction may be obtained by chromatography (affinity, ionic exchange, gel filtration, etc.), selective precipitation with salts such as ammonium sulfate, organic solvents such as ethanol, or polymers such as polyethyleneglycol.

For making a monoclonal antibody, antibody-producing cells, e.g., spleen cells, may isolated from the immunized transgenic animal and used either in cell fusion with transformed cell lines for the production of hybridomas. The procedures for making monoclonal antibodies are well established in the art. See, e.g., European Patent Application 0 583 980 A1, U.S. Pat. No. 4,977,081, WO 97/16537, and EP 0 491 057 B1, the disclosures of which are incorporated herein by reference. In vitro production of monoclonal antibodies from cloned cDNA molecules has been described by Andris-Widhopf et al., J Immunol Methods 242:159 (2000), and by Burton, Immunotechnology 1:87 (1995), the disclosures of which are incorporated herein by reference.

Alternatively, monoclonal antibodies may be isolated from the immunized transgenic animal and the cDNAs encoding antibodies are cloned by standard molecular biology techniques into expression vectors. The expression vectors can be introduced into cells in a manner suitable for subsequent expression of the nucleic acid. The method of introduction is largely dictated by the targeted cell type, discussed below. Exemplary methods include CaPO$_4$ precipitation, liposome fusion, cationic liposomes, electroporation, viral infection, dextran-mediated transfection, polybrene-mediated transfection, protoplast fusion, and direct microinjection.

Appropriate host cells for the expression of antibodies or antigen-binding fragments thereof include yeast, bacteria, insect, plant, and mammalian cells. Of particular interest are bacteria such as *E. coli*, fungi such as *Saccharomyces cerevisiae* and *Pichia pastoris*, insect cells such as SF9, mammalian cell lines (e.g., human cell lines), as well as primary cell lines.

In some embodiments, an antibody or fragment thereof can be expressed in, and purified from, transgenic animals (e.g., transgenic mammals). For example, an antibody can be produced in transgenic non-human mammals (e.g., rodents) and isolated from milk as described in, e.g., Houdebine (2002) *Curr Opin Biotechnol* 13(6):625-629; van Kuik-Romeijn et al. (2000) *Transgenic Res* 9(2): 155-159; and Pollock et al. (1999) *J Immunol Methods* 231(1-2):147-157.

The antibodies and fragments thereof can be produced from the cells by culturing a host cell transformed with the expression vector containing nucleic acid encoding the antibodies or fragments, under conditions, and for an amount of time, sufficient to allow expression of the proteins. Such conditions for protein expression will vary with the choice of the expression vector and the host cell, and will be easily ascertained by one skilled in the art through routine experimentation. For example, antibodies expressed in *E. coli* can be refolded from inclusion bodies (see, e.g., Hou et al. (1998) *Cytokine* 10:319-30). Bacterial expression systems and methods for their use are well known in the art (see Current Protocols in Molecular Biology, Wiley & Sons, and Molecular Cloning—A Laboratory Manual—3rd Ed., Cold Spring Harbor Laboratory Press, New York (2001)). The choice of codons, suitable expression vectors and suitable host cells will vary depending on a number of factors, and may be easily optimized as needed. An antibody (or fragment thereof) described herein can be expressed in mammalian cells or in other expression systems including but not limited to yeast, baculovirus, and in vitro expression systems (see, e.g., Kaszubska et al. (2000) *Protein Expression and Purification* 18:213-220).

Following expression, the antibodies and fragments thereof can be isolated. An antibody or fragment thereof can be isolated or purified in a variety of ways known to those skilled in the art depending on what other components are present in the sample. Standard purification methods include electrophoretic, molecular, immunological, and chromatographic techniques, including ion exchange, hydrophobic, affinity, and reverse-phase HPLC chromatography. For example, an antibody can be purified using a standard anti-antibody column (e.g., a protein-A or protein-G column). Ultrafiltration and diafiltration techniques, in conjunction with protein concentration, are also useful. See, e.g., Scopes (1994) "Protein Purification, $3^{rd}$ edition," Springer-Verlag, New York City, New York. The degree of purification necessary will vary depending on the desired use. In some instances, no purification of the expressed antibody or fragments thereof will be necessary.

Methods for determining the yield or purity of a purified antibody or fragment thereof are known in the art and include, e.g., Bradford assay, UV spectroscopy, Biuret protein assay, Lowry protein assay, amido black protein assay, high pressure liquid chromatography (HPLC), mass spectrometry (MS), and gel electrophoretic methods (e.g., using a protein stain such as Coomassie Blue or colloidal silver stain).

In some embodiments, the method may further include humanizing the antibody produced by the transgenic animal to include human framework regions. Methods of humanizing a mouse antibody are known in the art, and includes swapping the constant domain of the antibody with a human constant domain to make a chimeric antibody, as well as in certain cases humanizing the variable domains of the antibody by e.g., CDR grafting or resurfacing etc. Humanization can be done following the method of Winter (Jones et al., Nature 321:522 (1986); Riechmann et al., Nature 332:323 (1988); Verhoeyen et al., Science 239:1534 (1988)), Sims et al., J. Immunol. 151: 2296 (1993); Chothia and Lesk, J. Mol. Biol. 196:901 (1987), Carter et al., Proc. Natl. Acad. Sci. U.S.A. 89:4285 (1992); Presta et al., J. Immunol. 151:2623 (1993), U.S. Pat. Nos. 5,723,323, 5,976,862, 5,824,514, 5,817,483, 5,814,476, 5,763,192, 5,723,323, 5,766,886, 5,714,352, 6,204,023, 6,180,370, 5,693,762, 5,530,101, 5,585,089, 5,225,539; 4,816,567, PCT/:US98/16280, US96/18978, US91/09630, US91/05939, US94/01234, GB89/01334, GB91/01134, GB92/01755; WO90/14443, WO90/14424, WO90/14430, EP 229246, each entirely incorporated herein by reference, including references cited therein.

Once monoclonal antibodies that bind to different antigen have been isolated, bispecific antibodies can be made using any known methods. For example, two heavy chain sequences can be expressed in a single host cell along with a single common light chain, in which case a portion of the antibodies secreted by those cells should be bispecific. Alternatively, two heavy chains and the common light chain may be separately expressed and folded or joined together in vitro.

The heavy chains variable domain of the antibodies are made "naturally" (according to the natural process) by the immune system of the animal. In some embodiments, such antibodies can be post-translationally modified (e.g., glycosylated) by the host cell and comprise a glycosylation pattern and composition characteristic of the species of transgenic animal.

Antibody Libraries

In some embodiments, the disclosure provides for a library comprising a plurality of antibodies produced by one or more of any of the transgenic mice disclosed herein. In some embodiments, the disclosure provides for a method for making such a library. In some embodiments, the disclosure provides for a method of making a library comprising a plurality of antibodies comprising a single human κ variable domain, the method comprising the steps of: (a) exposing any of the transgenic mice disclosed herein to an antigen, such that there is sufficient time to develop an immune response to the antigen; (b) amplifying from the mouse of (a) a plurality of heavy chain variable region antibody sequences that specifically binds to the antigen, and (c) expressing the plurality of heavy chain variable region antibody sequences in a corresponding plurality of acceptor cells expressing a human κ variable domain, thereby generating a library comprising a plurality of antibodies comprising a single human κ variable domain.

In some embodiments, the method further comprises a step where nucleotide sequences encoding each of the heavy chain variable region antibody sequences in the plurality of sequences from (b) are each separately cloned into a plurality of display vectors. In some embodiments, the heavy chain variable region antibody sequences in the plurality of sequences from (b) are pooled before cloning into a plurality of display vectors. In some embodiments, the display vector is a mammalian display vector. In some embodiments, the vector further comprises a nucleotide sequence encoding Vκ1-39 in frame with a human Kappa constant nucleotide sequence. In some embodiments, the vector further comprises a nucleotide sequence encoding Vκ3-15 in frame with a human Kappa constant nucleotide sequence. In some embodiments, the acceptor cells are mammalian cells. In some embodiments, the acceptor cells are CHO cells or a derivative thereof. In some embodiments, the acceptor cells are human cells. In some embodiments, the acceptor cells are HEK-293 cells, or a derivative thereof. In some embodiments, the derivative thereof is Expi293F cells. In some embodiments, the acceptor cells of (c) express the antibodies on the surface of the cells. In some embodiments, the method further comprises the step of: (d) selecting acceptor cells expressing antibodies with higher antigen binding relative to other acceptor cells in the library. In some embodiments, the method further comprises the step of: (e)

determining the nucleotide sequences encoding the variable heavy chains of the antibodies expressed by the selected acceptor cells. In some embodiments, the method further comprises the step of: (e) determining the nucleotide sequences encoding the variable light chains of the antibodies expressed by the selected acceptor cells. In some embodiments, the method further comprises the step of: (e) determining the nucleotide sequences encoding the variable heavy chains and the variable light chains of the antibodies expressed by the selected acceptor cells.

EXAMPLES

While the present disclosure has been described with reference to the specific embodiments thereof, it should be understood by those skilled in the art that various changes may be made and equivalents may be substituted without departing from the true spirit and scope of the disclosure. In addition, many modifications may be made to adapt a particular situation, material, composition of matter, process, process step or steps, to the objective, spirit and scope of the present disclosure. All such modifications are intended to be within the scope of the disclosure.

Example 1: Generation of a hIGKV3-15/mIGKJ2 or hIGKV1-39 Knock-In Mouse

Figure 2:
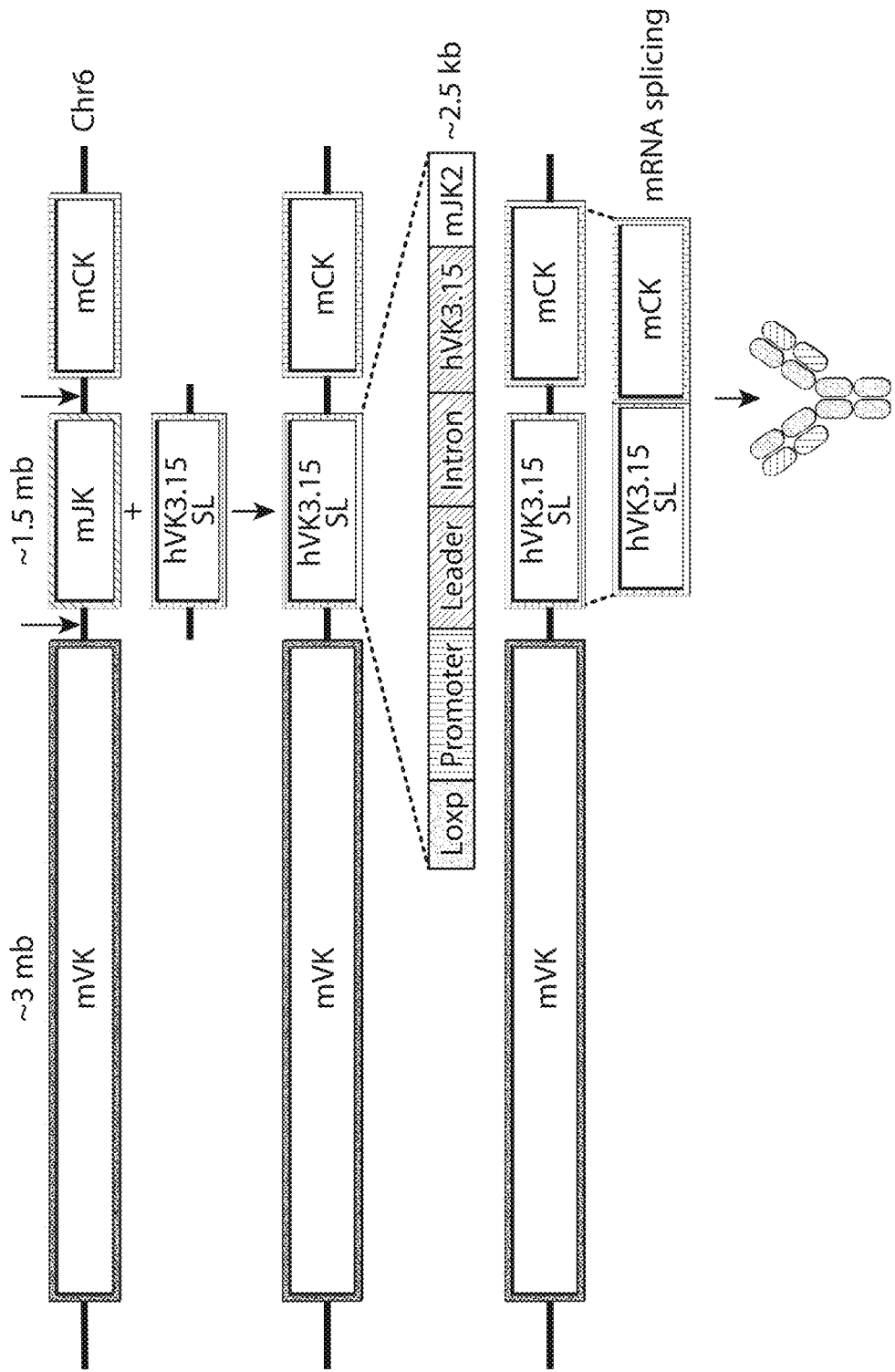
FIG. 2 shows a schematic of the mouse light chain Ig locus. The figure illustrates the replacement of the mouse Jκ segments with a human Vκ3.15 gene segment, wherein the Vκ1.39 SL is further identified as including: loxp, promoter, leader, intron, hVκ3.15, and mouse Jκ2.

Transgenic knock-in mice were generated using suitable synthetic guide RNAs (sgRNAs) for CRISPR-Cas9 mediated hIGKV1-39/mIGKJ2 knock-in (FIG. 1) or hIGKV3-15/mIGKJ2 knock-in (FIG. 2) in C57BL/6 mice zygotes. Donor DNA containing the hIGKV1-39/mIGKJ2 or hIGKV3-15/mIGKJ2 constructs was synthesized and sequence validated. The most potent sgRNA with minimal off-target potential was assembled into a ribonucleoprotein complex with Cas9 endonuclease and, together with the donor DNA, was delivered into zygotes from C57BL/6 mice followed by embryo transfer into pseudo pregnant females. Viable progeny were analyzed for the presence of the desired mutation by genomic PCR and DNA sequencing. Transgenic founder animals were selected and bred with C57BL/6 mice to produce F1 progeny heterozygous for the hIGKV1-39/mIGKJ2 and hIGKV3-15/mIGKJ2 knock-ins as confirmed by PCR-mediated genotyping and DNA sequence analysis.

Serum was isolated from three hIGKV1-39/mIGKJ2 transgenic knock-in mice, one hIGKV3-15/mIGKJ2 transgenic knock-in mice, one naïve wild-type mouse (control), and one wild-type mouse immunized with TNFR2 extracellular domain (control) and further purified to validate that the transgenic knock-in mice are capable of generating antibodies comprising a common light chain. Specifically, either a Protein A or Protein L column was used to evaluate various immunoglobulin classes and subclasses as Protein L columns binds a wider range of immunoglobulin classes and subclasses in mice (IgM, IgG1, IgG2a, IgG2b, and IgG3) than a Protein A column (IgG1, IgG2a, IgG2b, and IgG3) binds. Thus, various immunoglobulin classes and subclasses can be evaluated for their expression of a common light chain.

Protein A Column

For each mouse, 20 µL of serum was purified using a Protein A resin (GE, MabSelect SuRe antibody purification resin) in batch mode and rotation at room temperature for 3 hours in 100 µL of PBS. The resin was washed 3 times with PBS, and the antibody eluted using 50 µL and then 15 µL of 10 mM glycine at pH2.3. The resin was then neutralized with 5 µL of 1M TRIS base. 10 µL of each eluate was then reduced with 50 mM TCEP at room temperature for 30 minutes.

Protein L Column

For each mouse, 20 µL of serum was added to 500 µL of PBS and 0.05% CHAPS. The solution was then transferred into 100 µL of washed Protein L magnetic beads (Thermo Scientific, binding capacity: 110 µg Ig). The beads and solution were then rotated at room temperature for 1 hour. The resin was first washed twice with PBS and 0.05% CHAPS, and then washed twice with PBS alone. The antibody was eluted using 50 µL of 0.1M glycine at pH 2.3. The resin was then neutralized with 2.5 µL of 1M TRIS base. Each eluate was then reduced with 100 mM DTT at 37° C. for 30 minutes.

LC/MS Analysis

The eluates were then individually subjected to LC-MS analysis using a C4 column (80° C.) with a 5-60% linear gradient of acetonitrile in 0.05% formic acid and 0.05% TFA.

For the hIGKV1-39/mIGKJ2 and hIGKV3-15/mIGKJ2 transgenic knock-in mice, the following theoretical molecular weights would be expected with expression from the transgene:

TABLE 1

| Transgenic Knock-In Mouse | Number of Disulfide Bonds | Theoretical Molecular Weight |
| --- | --- | --- |
| hIGKV1-39/mIGKJ2 | Two pairs of internal disulfide bonds | 23386.86 |
| hIGKV1-39/mIGKJ2 | One pair of internal disulfide bonds | 23388.86 |
| hIGKV1-39/mIGKJ2 | All internal disulfide bonds are reduced | 23390.86 |
| hIGKV3-15/mIGKJ2 | Two pairs of internal disulfide bonds | 23428.95 |
| hIGKV3-15/mIGKJ2 | One pair of internal disulfide bonds | 23430.95 |
| hIGKV3-15/mIGKJ2 | All internal disulfide bonds are reduced | 23432.95 |

Figure 3:
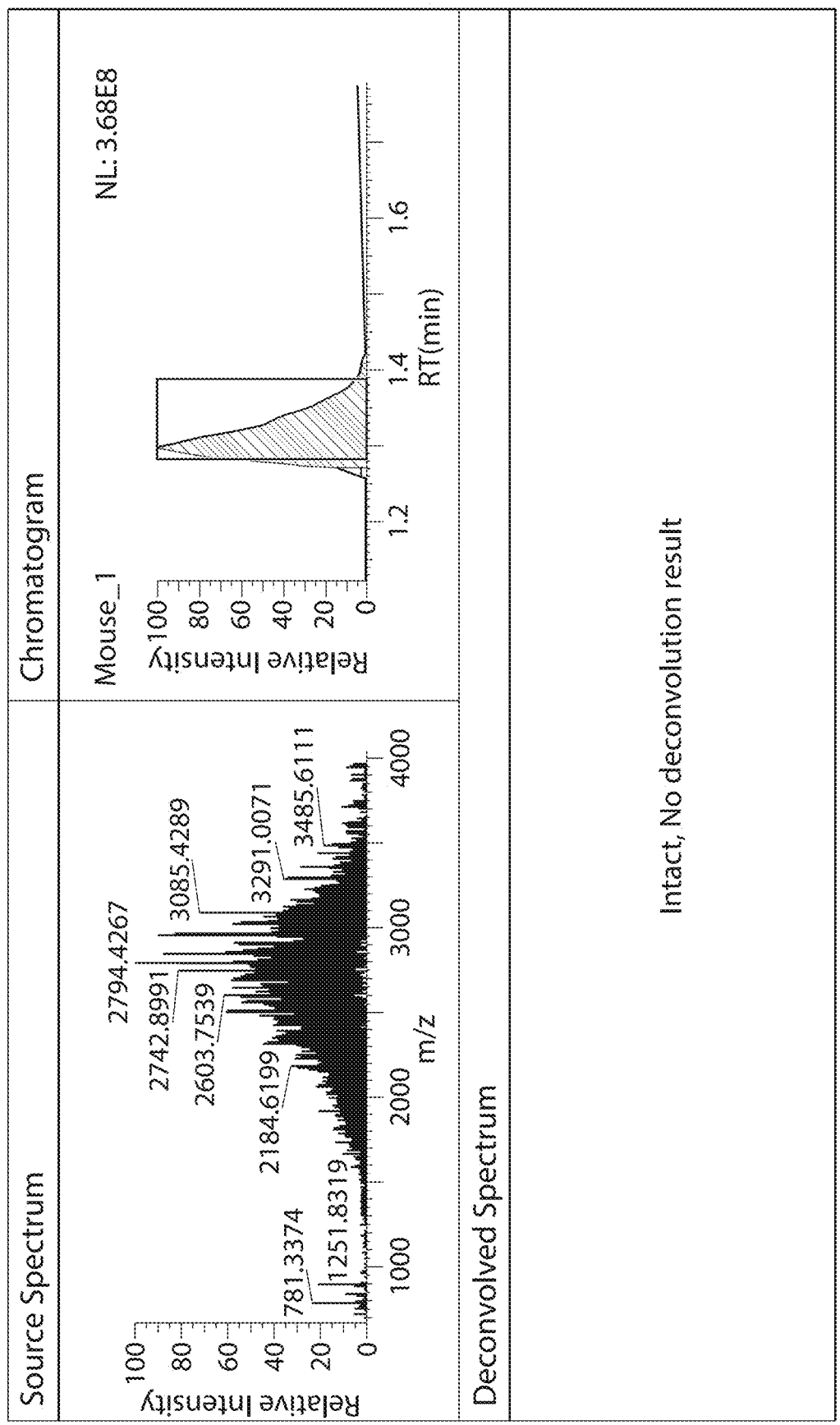
FIG. 3 shows LC/MS data from hIGKV1-39/mIGKJ2 transgenic mouse 1. Antibodies were isolated using the Protein L Resin. The deconvolved LC/MS data shows a peak with no deconvolution result.
Figure 4:
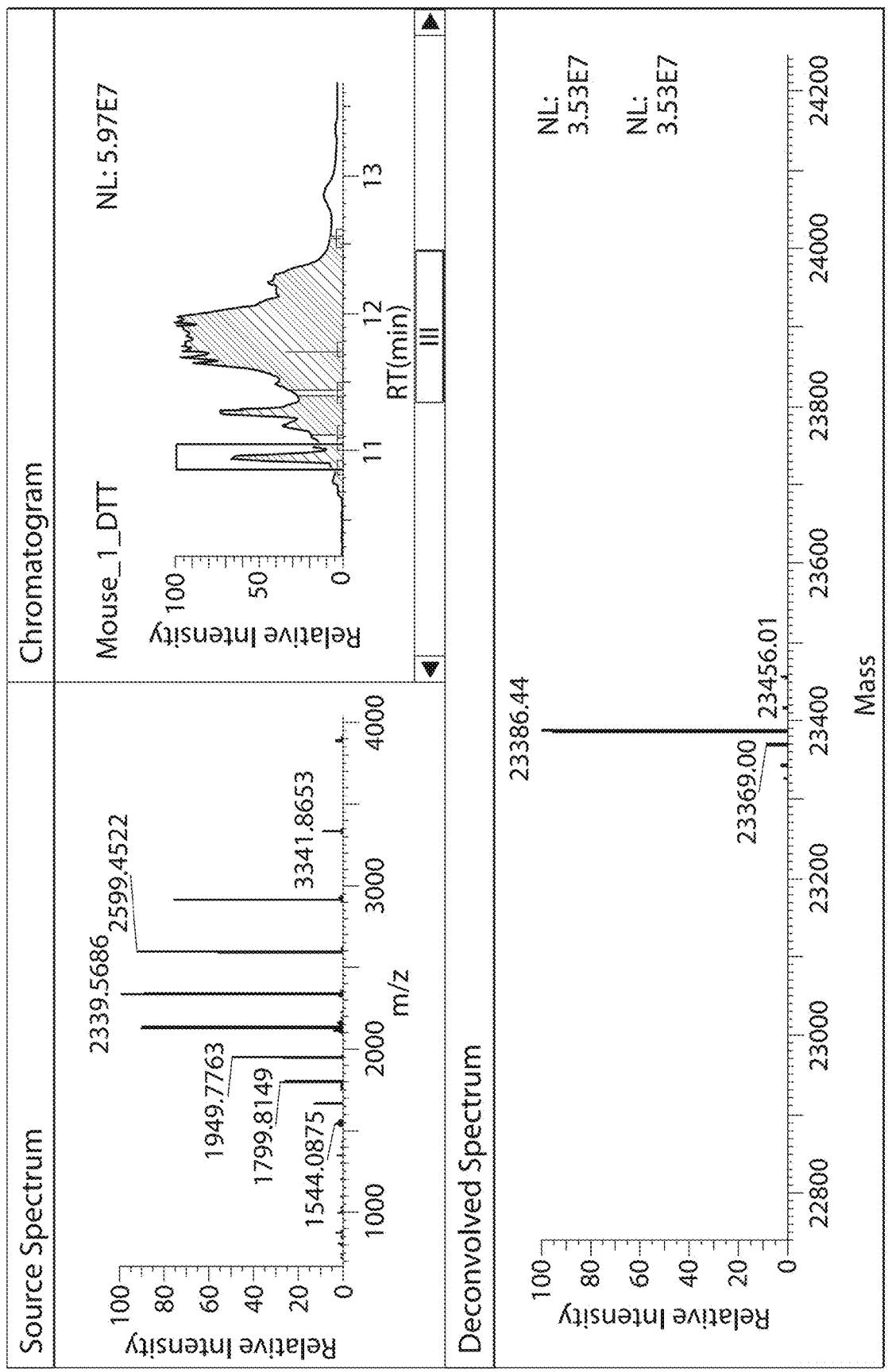
FIG. 4 shows LC/MS data from hIGKV1-39/mIGKJ2 transgenic mouse 1. Antibodies were isolated using the Protein L Resin. The deconvolved LC/MS data shows a peak comprising a light chain with two pairs of internal disulfide bonds.
Figure 5:
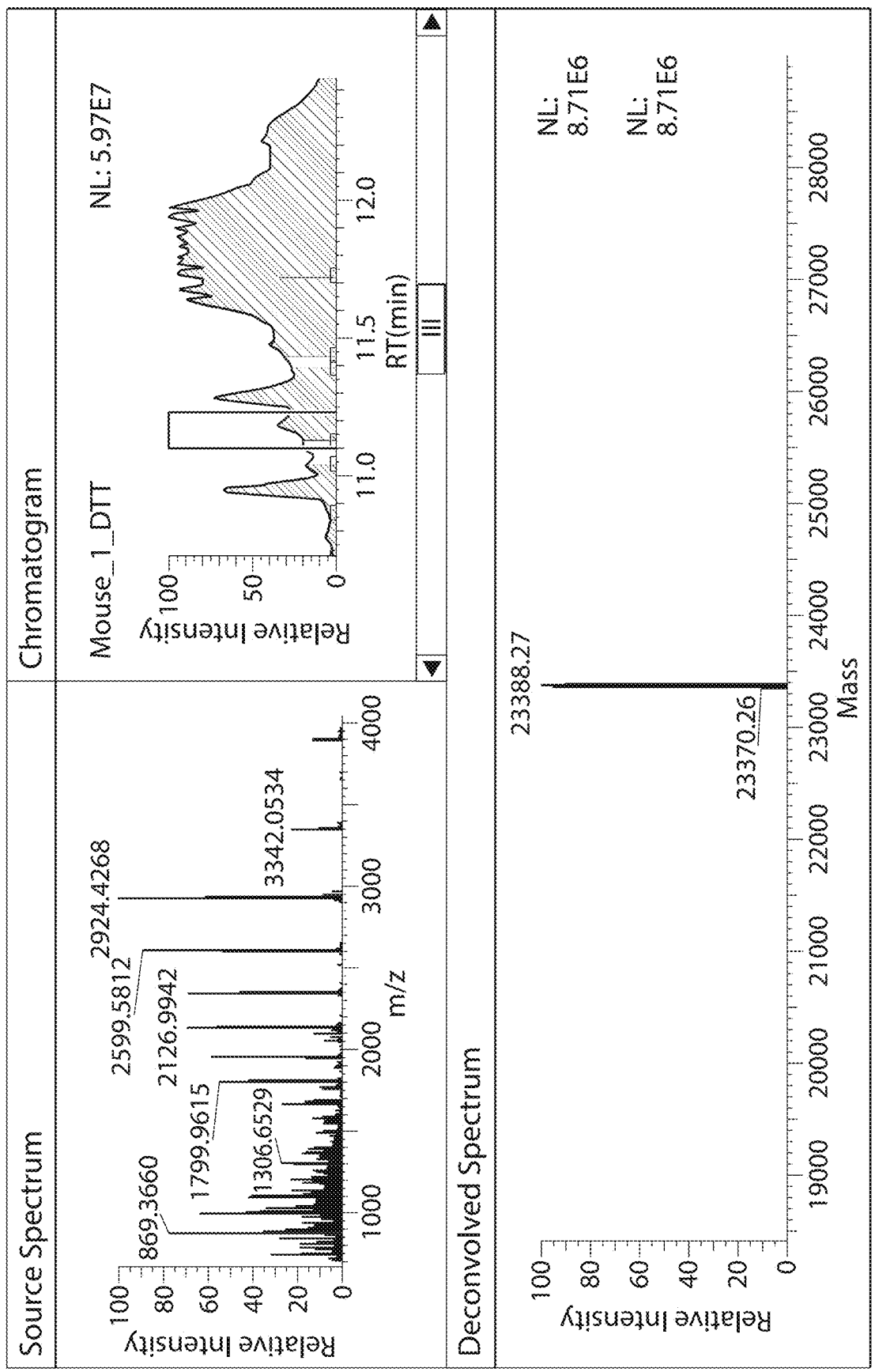
FIG. 5 shows LC/MS data from hIGKV1-39/mIGKJ2 transgenic mouse 1. Antibodies were isolated using the Protein L Resin. The deconvolved LC/MS data shows a peak comprising a light chain with one pair of internal disulfide bonds.
Figure 6:
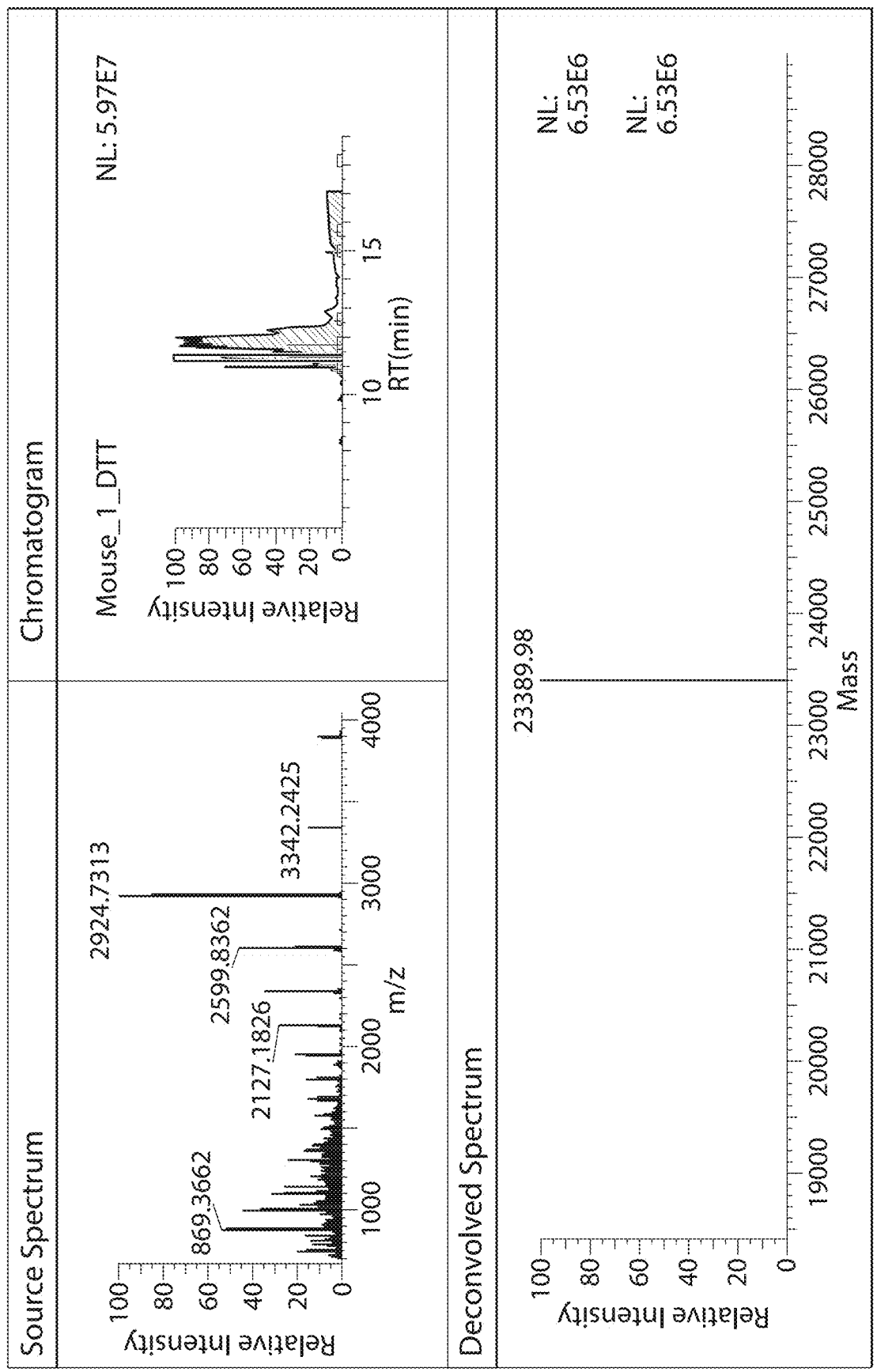
FIG. 6 shows LC/MS data from hIGKV1-39/mIGKJ2 transgenic mouse 1. Antibodies were isolated using the Protein L Resin. The deconvolved LC/MS data shows a peak comprising a light chain with all internal disulfide bonds are reduced.
Figure 7:
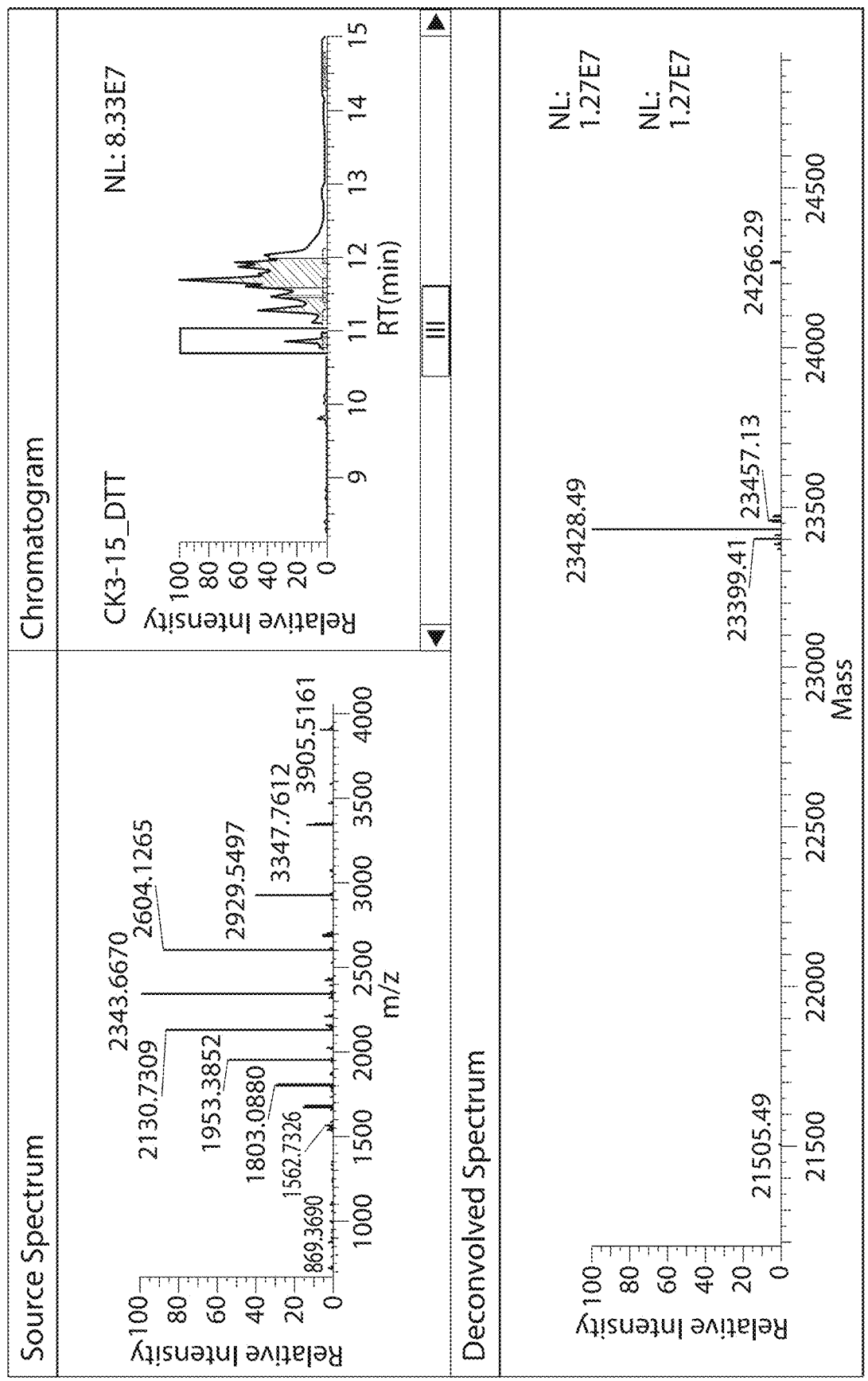
FIG. 7 shows LC/MS data from hIGKV3-15/mIGKJ2 transgenic mouse 1. Antibodies were isolated using the Protein L Resin. The deconvolved LC/MS data shows a peak comprising a light chain with two pairs of internal disulfide bonds.
Figure 8:
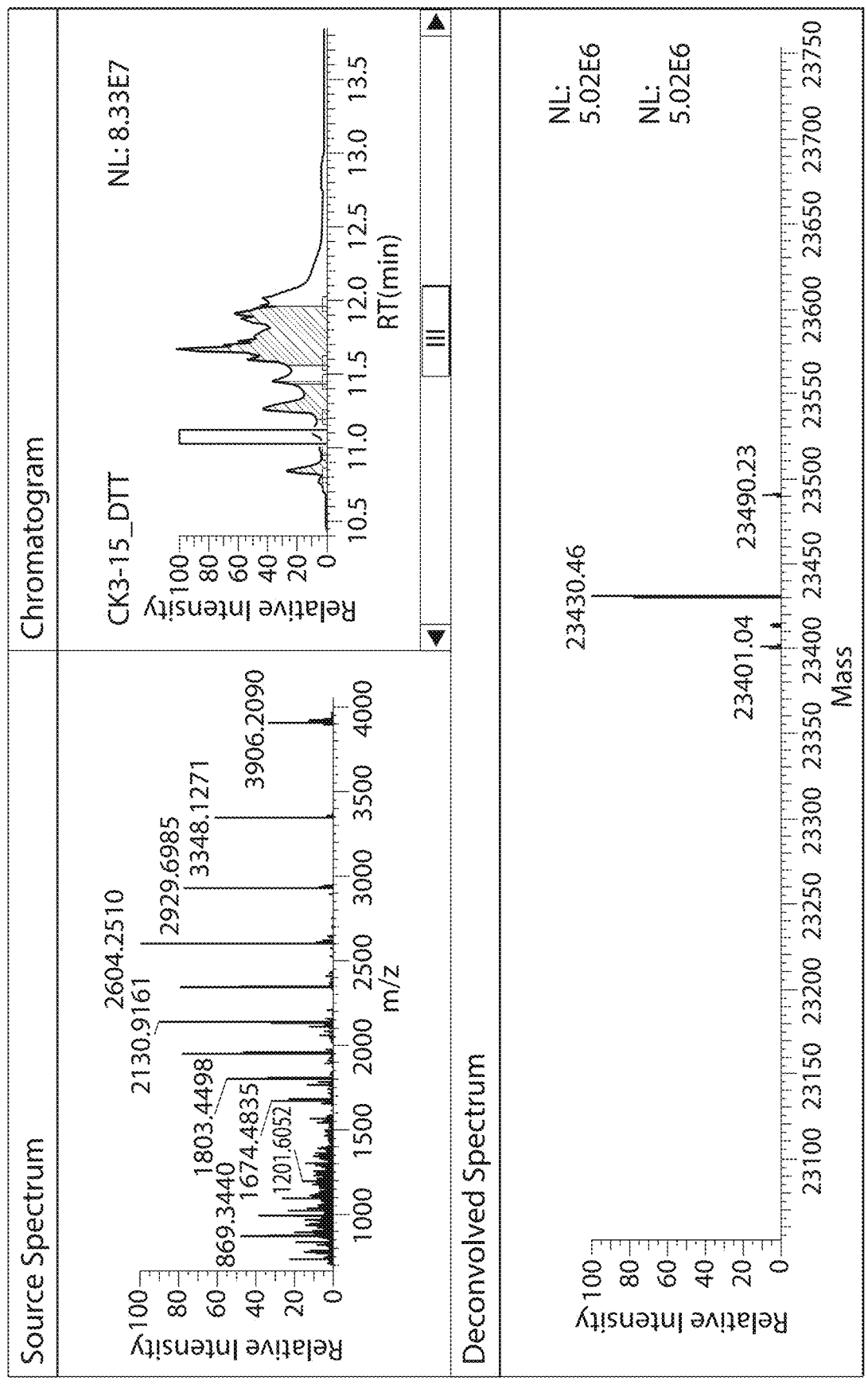
FIG. 8 shows LC/MS data from hIGKV3-15/mIGKJ2 transgenic mouse 1. Antibodies were isolated using the Protein L Resin. The deconvolved LC/MS data shows a peak comprising a light chain with one pair of internal disulfide bonds.

For each of the hIGKV1-39/mIGKJ2 transgenic knock-in mice, the predominant light chain species is congruent with the theoretical molecular weight of the hIGKV1-39/mIGKJ2 transgene (Table 1). Exemplary data for antibodies isolated using the Protein L magnetic beads can be seen in FIGS. 3-6. Specifically, FIGS. 4-6 show the deconvolution of LC/MS data obtained from the sample of hIGKV1-39/mIGKJ2 mouse 1. The deconvolved data shows the presence of common light chains containing either two pairs of internal disulfide bonds (FIG. 4), one pair of internal disulfide bonds (FIG. 5), or light chains in which all internal disulfide bonds are reduced (FIG. 6) in mouse 1. FIG. 3 shows data from peaks which did not produce a deconvolution result. Similar light chains were seen in LC/MS data from hIGKV1-39/mIGKJ2 transgenic mouse 2 and mouse 3 (data not shown). Furthermore, similar results were observed from antibodies isolated using the Protein A resin described above (data not shown). Immunized wild-type mice expressed an array of light chain species, and there were no apparent common light chains with molecular weights falling within the theoretical molecular weights seen in for the hIGKV1-39/mIGKJ2 transgenic mice in Table 1 (data not shown). From this data, we conclude that the hIGKV1-39/mIGKJ2 transgenic knock-in mice express a predominant light chain species which agrees with the theoretical molecular weight for the hIGKV1-39/mIGKJ2 transgene.

Figure 9:
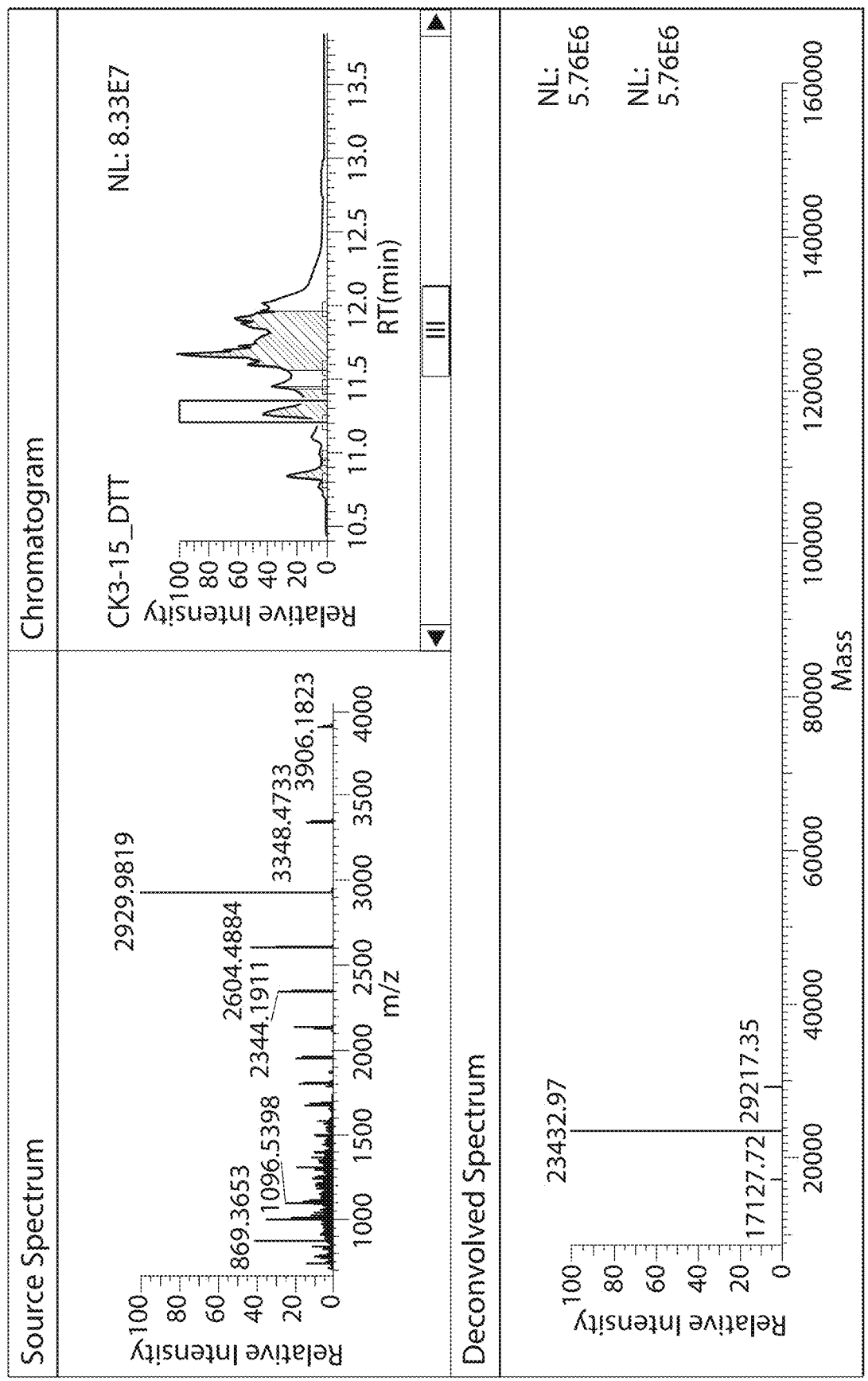
FIG. 9 shows LC/MS data from hIGKV3-15/mIGKJ2 transgenic mouse 1. Antibodies were isolated using the Protein L Resin. The deconvolved LC/MS data shows a peak comprising a light chain with all internal disulfide bonds are reduced.
Figure 10:
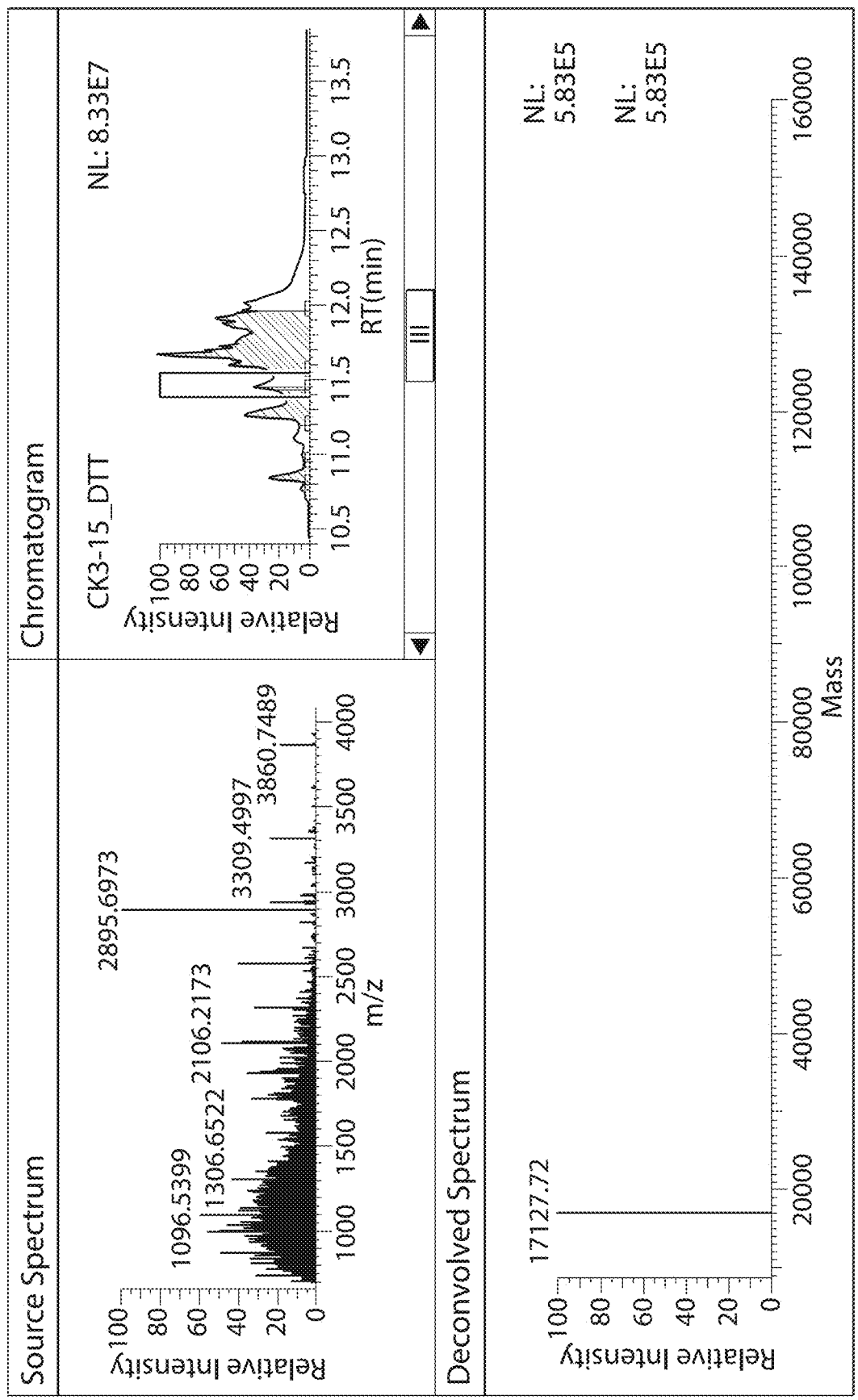
FIG. 10 shows LC/MS data from hIGKV3-15/mIGKJ2 transgenic mouse 1. Antibodies were isolated using the Protein L Resin. The deconvolved LC/MS data shows a peak with an apparent mass of 17127.72.
Figure 11:
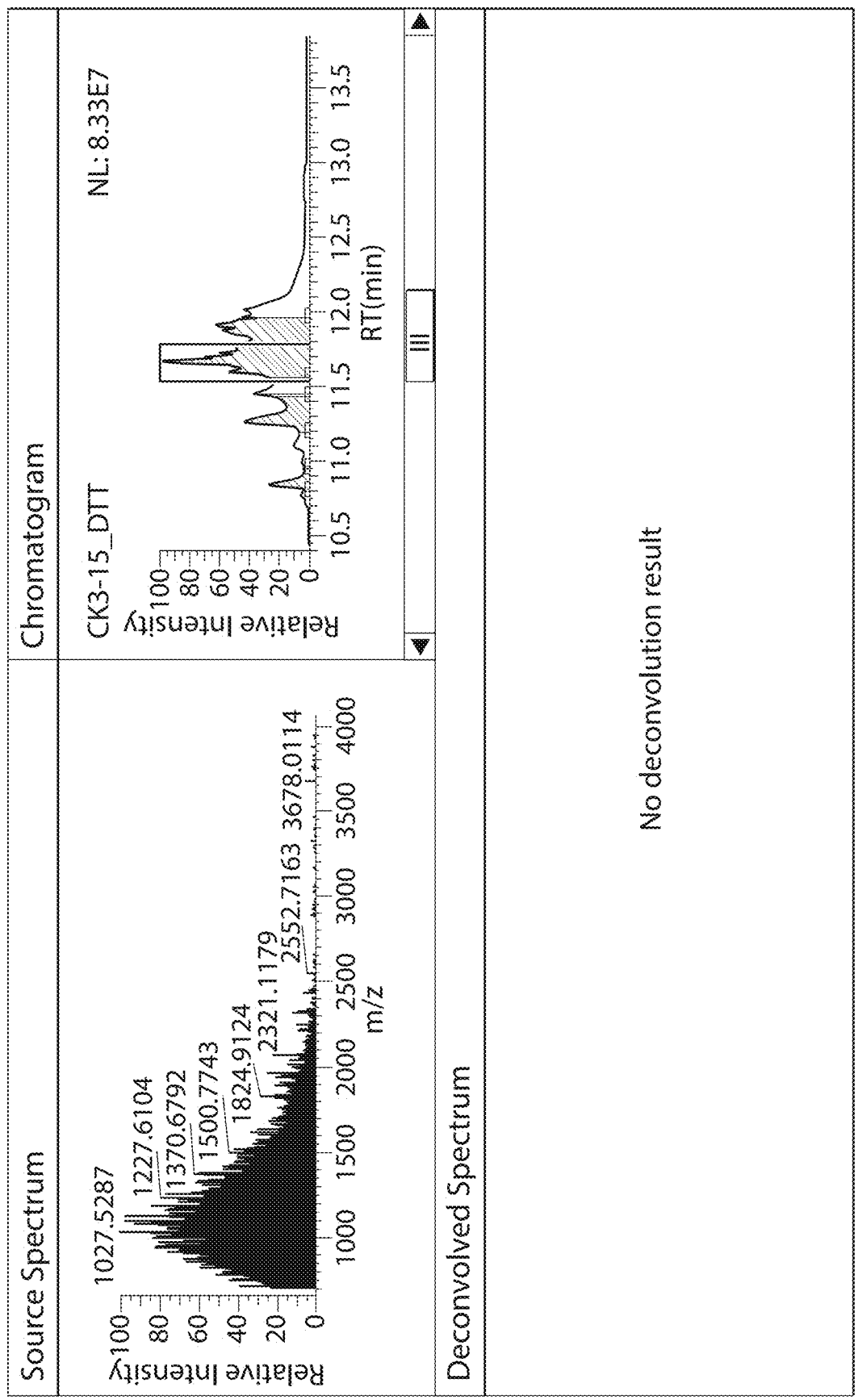
FIG. 11 shows LC/MS data from hIGKV3-15/mIGKJ2 transgenic mouse 1. Antibodies were isolated using the Protein L Resin. The deconvolved LC/MS data shows a peak with no deconvolution result.
Figure 12:
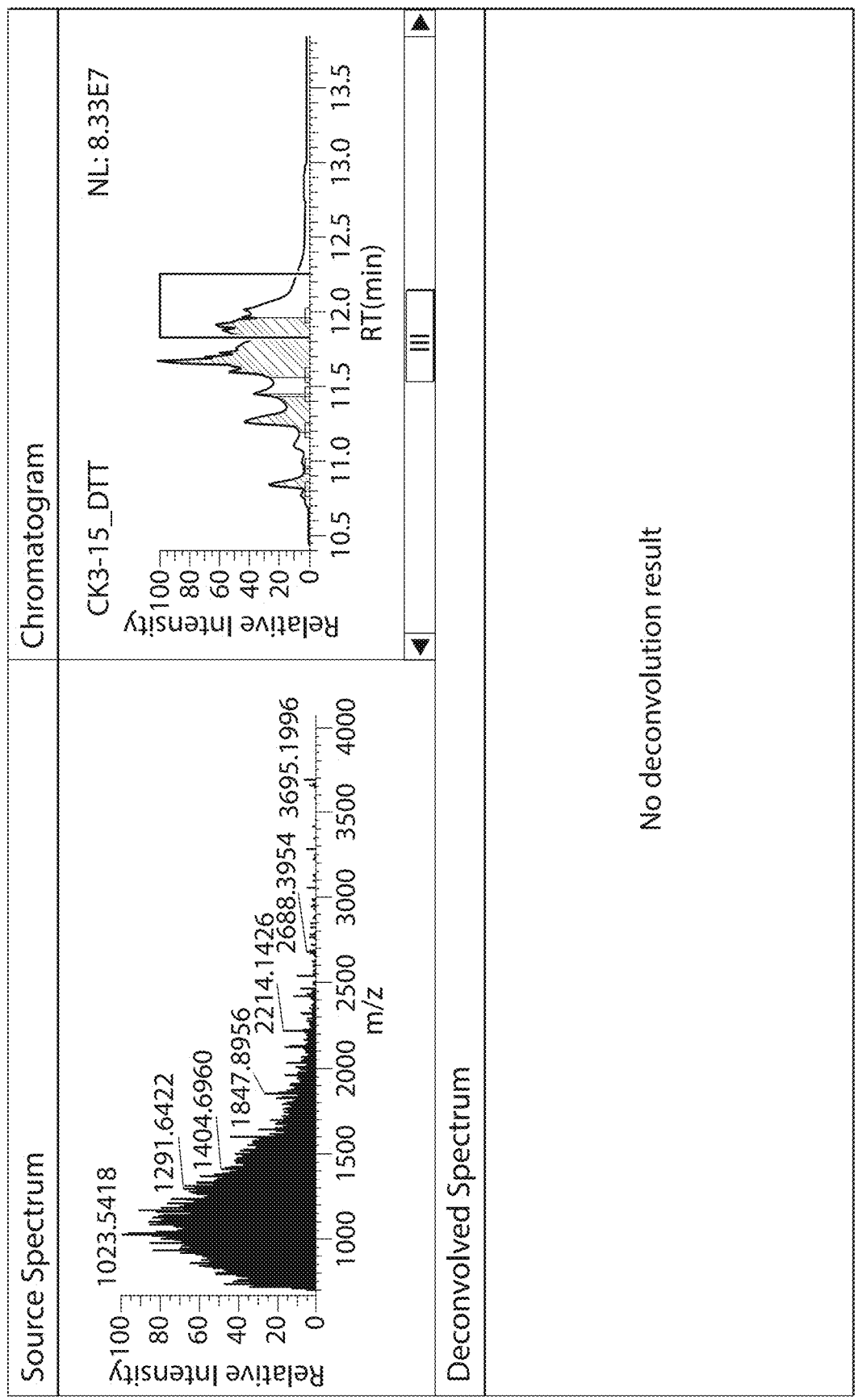
FIG. 12 shows LC/MS data from hIGKV3-15/mIGKJ2 transgenic mouse 1. Antibodies were isolated using the Protein L Resin. The deconvolved LC/MS data shows a peak with no deconvolution result.

For each of the hIGKV3-15/mIGKJ2 transgenic knock-in mice, the predominant light chain species is congruent with the theoretical molecular weight of the hIGKV3-15/mIGKJ2 transgene (Table 1). Exemplary data for antibodies isolated using the Protein L magnetic beads can be seen in FIGS. 7-12. Specifically, FIGS. 7-12 show the deconvolution of LC/MS data obtained from the purified antibodies of hIGKV3-15/mIGKJ2 mouse 1. The deconvolved data shows the presence of common light chains containing either two pairs of internal disulfide bonds (FIG. 7), one pair of internal disulfide bonds (FIG. 8), or light chains in which all internal disulfide bonds are reduced (FIG. 9). FIGS. 11 and 12 show data from peaks which did not produce a deconvolution result. Naive wild-type mice expressed an array of light chain species, and there were no apparent common light chains with molecular weights falling within the theoretical molecular weights seen in for the hIGKV3-15/mIGKJ2 transgenic mice in Table 1 (data not shown). From this data, we conclude that the hIGKV3-15/mIGKJ2 transgenic knock-in mice express a predominant light chain species which agrees with the theoretical molecular weight for the hIGKV1-39/mIGKJ2 transgene.

Example 2—Immunization of Heterozygous and Homozygous hIGKVK3-15/mIGKJ2 Mice

Three mice heterozygous for the hIGKV3-15/mIGKJ2 transgene and one wild-type C57BL/6 mouse were immunized with a recombinant human NKp46 extracellular domain (ECD) fused to a mouse IgG2a Fc domain (SEQ ID NO: 11). All animals received a priming immunization with 40 µg antigen mixed with Complete Freund's Adjuvant (CFA) administered subcutaneously on Day 1, followed by boosts with 20 µg protein plus Incomplete Freund's Antigen (IFA) subcutaneously on Days 14 and 28. A final intraperitoneal injection of 25 µg antigen in PBS was administered on Day 50. Test bleeds were performed on Day 21 and 35. Four days after the final boost, animals were sacrificed and spleens harvested.

Heterozygous mice at 6-8 weeks old were bred to generate homozygous animals carrying two copies of either the hIGKV1-39/mIGKJ2 or hIGKV3-15/mIGKJ2 transgene. Homozygous offspring were confirmed by genotyping. One homozygous hIGKV3-15/mIGKJ2 animal was immunized subcutaneously with 40 µg NKp46/CFA on Day 1 followed by subcutaneous boosts with 20 µg antigen/IFA on Days 14 and 28, and a final intraperitoneal boost with 25 µg antigen on Day 42. Test bleeds were collected on Day 21 and 35.

Figure 13:
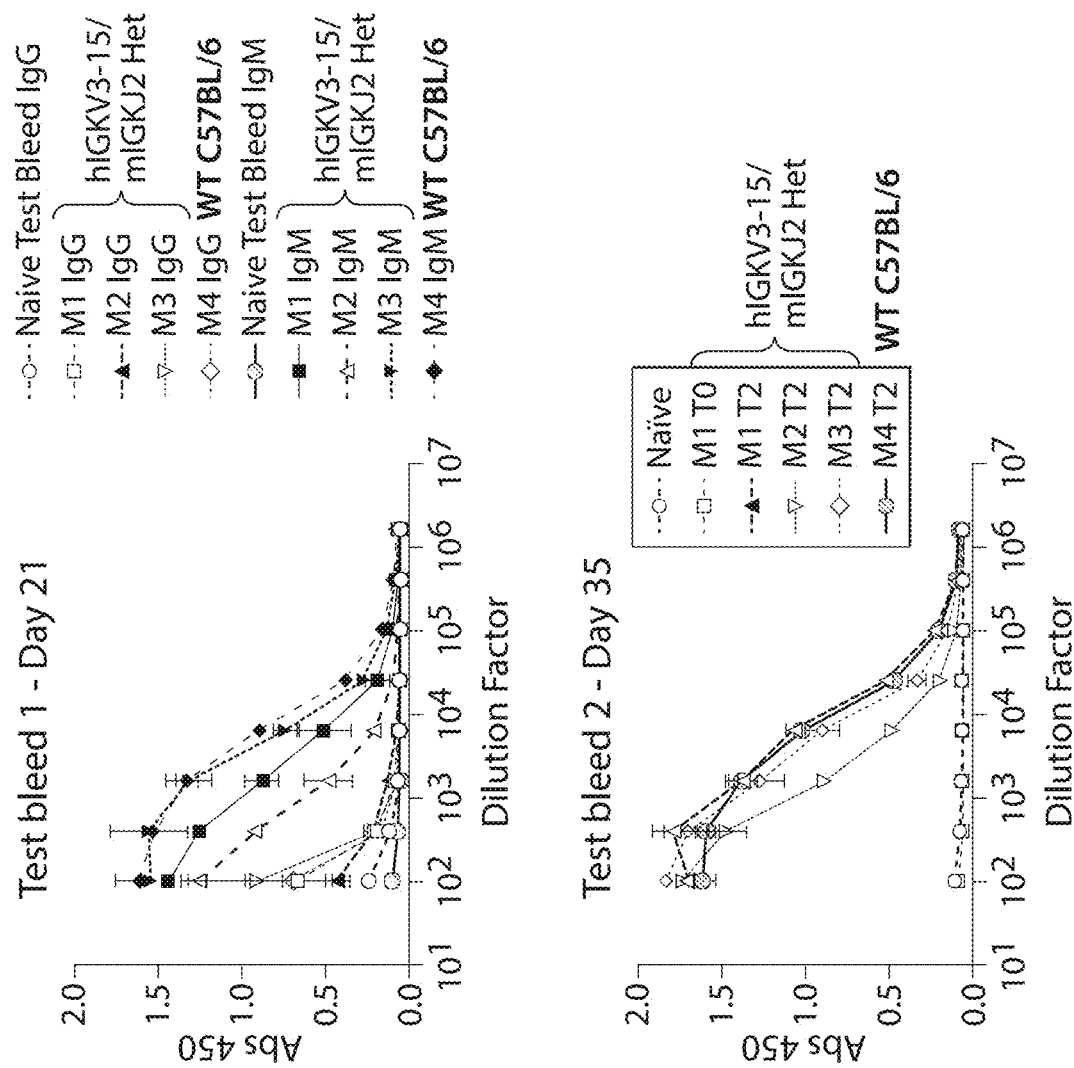
FIG. 13 demonstrates that heterozygous animals develop robust IgM and IgG responses against the immunized NKp46 antigen with similar titers as wild-type C57BL/6 mice.
Figure 14:
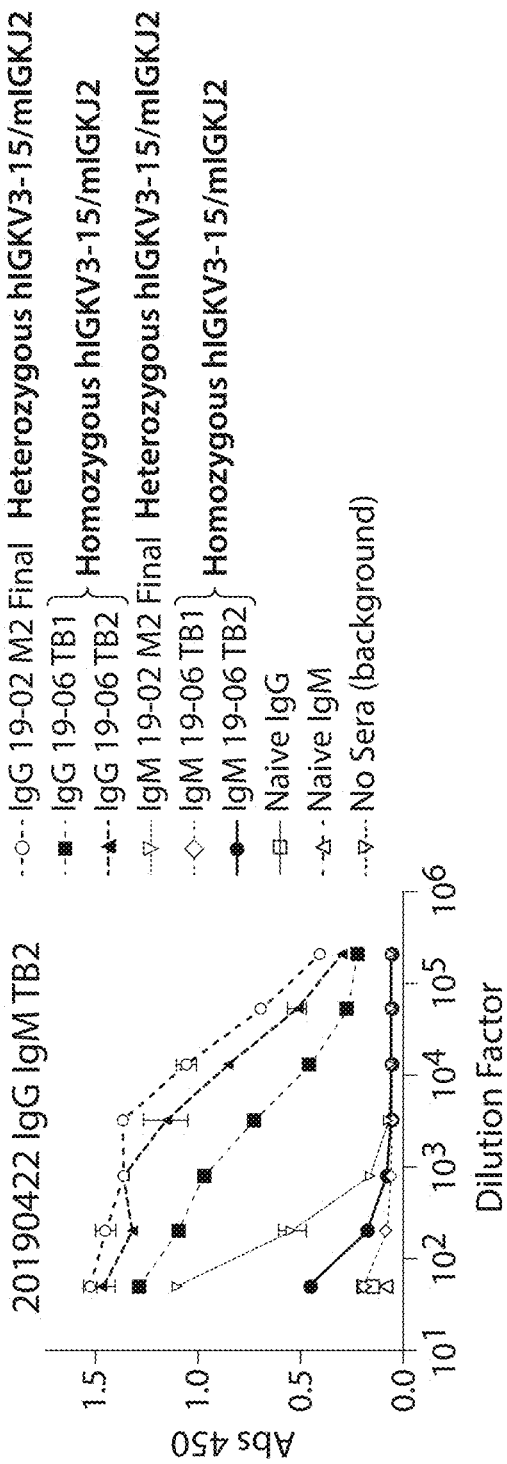
FIG. 14 demonstrates that heterozygous and homozygous animals develop robust IgM and IgG responses against the immunized NKp46 antigen.

ELISAs were performed to test for a specific antibody response. Nunc MAXISORB plates were coated over night at 4° C. with 100 µL of antigen at 1 µg/mL. Plates were blocked with 150 µL PBS+2% BSA at 4° C. then washed three times with PBS-T. Dilutions of mouse sera in 100 µL final volume PBS/0.2% BSA were added to each well and incubated at RT for 1 hour. Wells were washed three times with PBS-T then incubated with anti-mouse-IgG-HRP (Jackson 115-035-072) or anti-mouse IgM u-chain-HRP (Jackson 115-035-075) for 1 hour at room temperature. Plates were rewashed and incubated with 100 µL TMB substrate, before measuring absorbance at 450 nm. Both the heterozygous (FIG. 13) and homozygous (FIG. 14) animals develop robust IgM and IgG responses against the immunized antigen with similar titers as wild-type C57BL/6 mice.

Example 3—Isolation of Specific, Common Light Chain Antibodies from hIGKVK3-15/mIGKJ2 Mice Single-cell suspension of spleens from two of the immunized heterozygous hIGKV3-15/mIGKJ2 mice were prepared. After Fc blocking, cells were stained with a dead cell marker, anti-CD4, anti-CD8a, anti-GR1, anti-F4/80, anti-CD19, anti-IgM, anti-IgG1, anti-IgG2a/b, and a tetrameric NKp46 antigen, all fluorescently labelled. Live cells negative for CD4, CD8, GR1, F4/80 and IgM, but positive for CD19, IgG1 or 2a/b, and NKp46 antigen were bulk sorted for further sequencing. Heavy chain sequences were recovered by single round PCR using forward primer covering VH sequences and reverse primers for mouse IgG. Pooled VH sequences were cloned into soluble expression vectors in frame with a human IgG1 constant domain, transformed in *E. coli*, and individual colonies selected, mini-prepped, and sequenced. Plasmids for 62 unique heavy chains were transiently transfected in Expi293F cells cultured in 24 well plates along with an equal concentration of plasmid encoding the hIGKV3-15/mIGKJ2 light chain with a human Kappa constant domain. Following 5 days incubated shaking at 37° C., supernatants were harvested and antibody purified using Protein-A magnetic beads on Kingfisher Flex System. Eluted antibodies were buffer exchanged into PBS. 58 out of 62 clones were purified with yield >100 µg.

Figure 15:
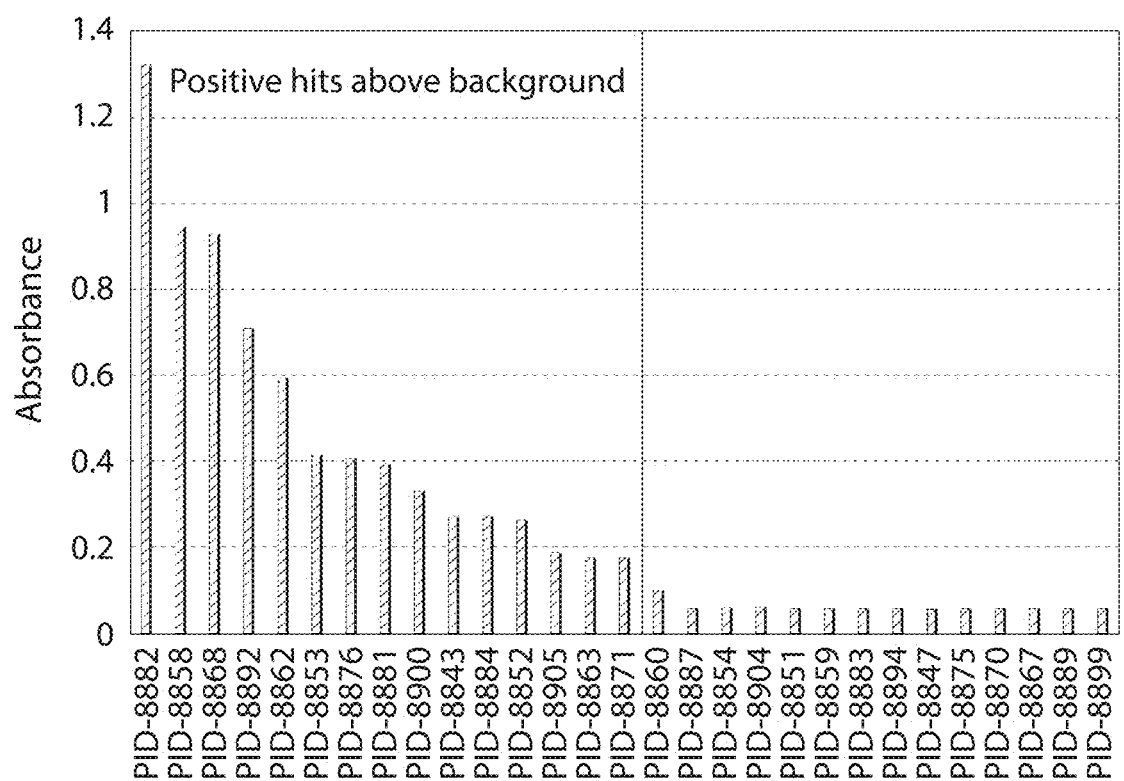
FIG. 15 shows that, out of 58 purified clones, 16 demonstrated specific binding to the NKp46-Fc antigen above background, representing 8 IGHV germlines and 13 unique CDRH3 families.

Purified clones were tested for binding to the NKp46-Fc antigen by ELISA. 0.1 µg/mL antibody was added to antigen coated plates and incubated at RT. Wells were washed and bound antibody detected with 100 µL of secondary antibody (HRP-anti-human Fab'2 specific (Jackson 209-035-097). Out of 58 purified clones, 16 demonstrated specific binding to the NKp46-Fc antigen above background representing 8 IGHV germlines and 13 unique CDRH3 families (FIG. 15). Without wishing to be bound or limited by theory, the relatively low binding rate likely reflects the fact that these antibodies were generated in heterozygous mice containing one transgenic and one wild-type mouse light chain locus, such that only a fraction of the amplified heavy chains pair with the hIGKV3-15/mIGKJ2 common light chain.

Example 4—Generation of an Immune Library from hIGKVK3-15/mIGKJ2 and hIGKVK1-39/mIGKJ2 Mice Five homozygous hIGKV3-15/mIGKJ2 and 5 heterozygous hIGKV1-39/mIGKJ2 mice were immunized with a recombinant fragment of human MUC-16 containing a c-terminal His tag (SEQ ID NO: 12). Animals received a subcutaneous priming immunization with 40 µg antigen/CFA on Day 1, followed by boosts with 20 µg protein/IFA subcutaneously on Days 14 and 28. A final intraperitoneal injection with 25 µg antigen in PBS was administered on Day 40. Test bleeds were taken on Days 21 and 35, and animals were sacrificed and spleens harvested on Day 44.

Figure 16:
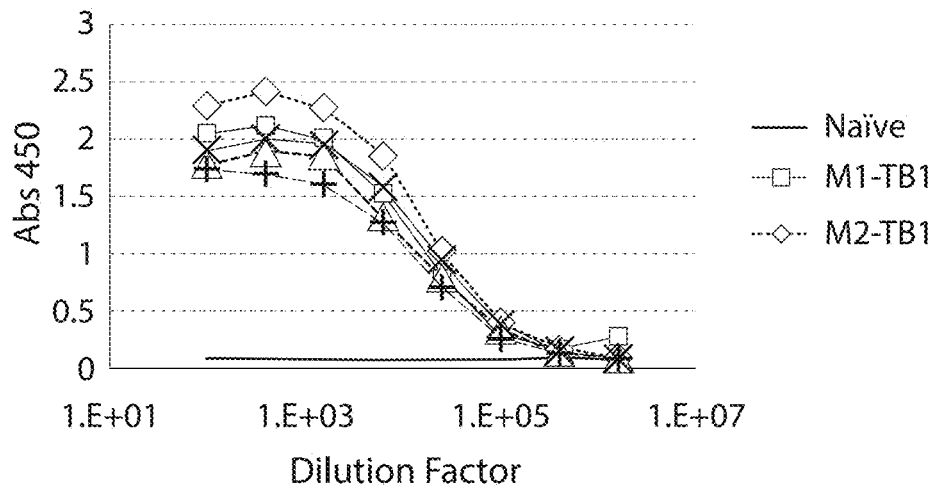
FIG. 16 demonstrates that heterozygous hIGKVK1-39/mIGKJ2 mice develop strong IgG responses against the MUC-16 antigen.
Figure 16:
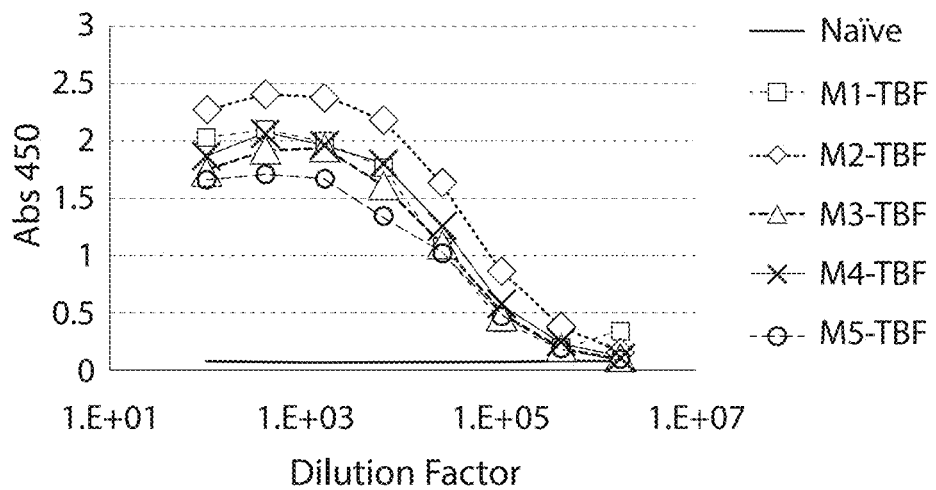
Figure 17:
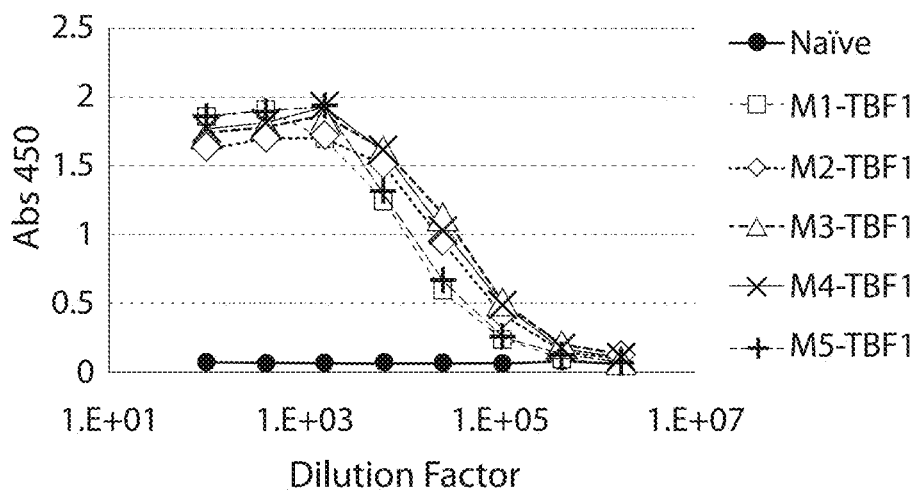
FIG. 17 demonstrates that homozygous hIGKVK3-15/mIGKJ2 mice develop strong IgG responses against the MUC-16 antigen.
Figure 17:
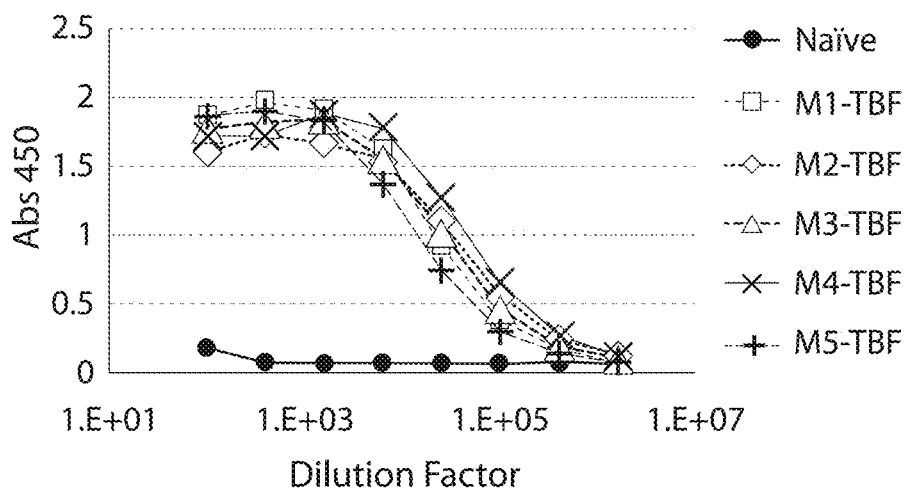

ELISAs were performed to test for a specific antibody response. Nunc MAXISORB plates were coated over night at 4° C. with 100 µL of MUC-16 antigen at 1 µg/ml concentration. Plates were blocked with 150 µL PBS+2% BSA O/N at 4° C. then washed three times with PBS-T. Dilutions of mouse sera in 100 µL final volume PBST/0.2% BSA were added to each well and incubated at room temperature for 1 hour. Wells were washed three times with PBS-T, then incubated with anti-mouse-IgG-HRP (Jackson 115-035-072) for 1 hour at room temperature. Plates were rewashed and incubated with 100 µL TMB substrate, before measuring absorbance at 450 nm. Both the heterozygous hIGKVK1-39/mIGKJ2 mice (FIG. 16) and homozygous hIGKVK3-15/mIGKJ2 mice (FIG. 17) develop strong IgG responses against the MUC-16 antigen.

Spleens from one immunized hIGKVK1-39/mIGKJ2 mouse and one immunized hIGKVK3-15/mIGKJ2 mouse were washed in PBS, lysed, and RNA purified using PURE-LINK RNA Mini Kit (Thermo Fisher Scientific 12183018A) according to manufacturer's instructions. cDNA was synthesized from 2.5 µg of each mRNA sample using SUPER-SCRIPT IV First-Strand Synthesis System (Thermo Fisher Scientific 18091050), purified using SPRISELECT beads (Beckman Coulter B23317), and eluted in 0.1×TE buffer. Mouse VH sequences were PCR amplified from the cDNA using degenerate forward primers for each family of mouse IgHV germlines and pooled reverse primers specific to mouse IgHJ chains.

Mammalian display vectors were generated containing dual promoters with a light chain cassette expressing either the hIGKV1-39/mIGKJ2 or hIGKV3-15/mIGKJ2 sequence in frame with a human Kappa constant sequence and a heavy chain cassette with a cloning site followed by a human IgG1 constant domain, linker, and c-terminal PDGFR transmembrane domain. VH library PCR products from the spleen of either the hIGKV1-39/mIGKJ2 or hIGKV3-15/mIGKJ2 mouse were Gibson cloned into display vectors containing the corresponding light chain expression cassette. Cloned libraries were transformed in E. coli and plasmid library DNA purified from the transformants.

Figure 18:
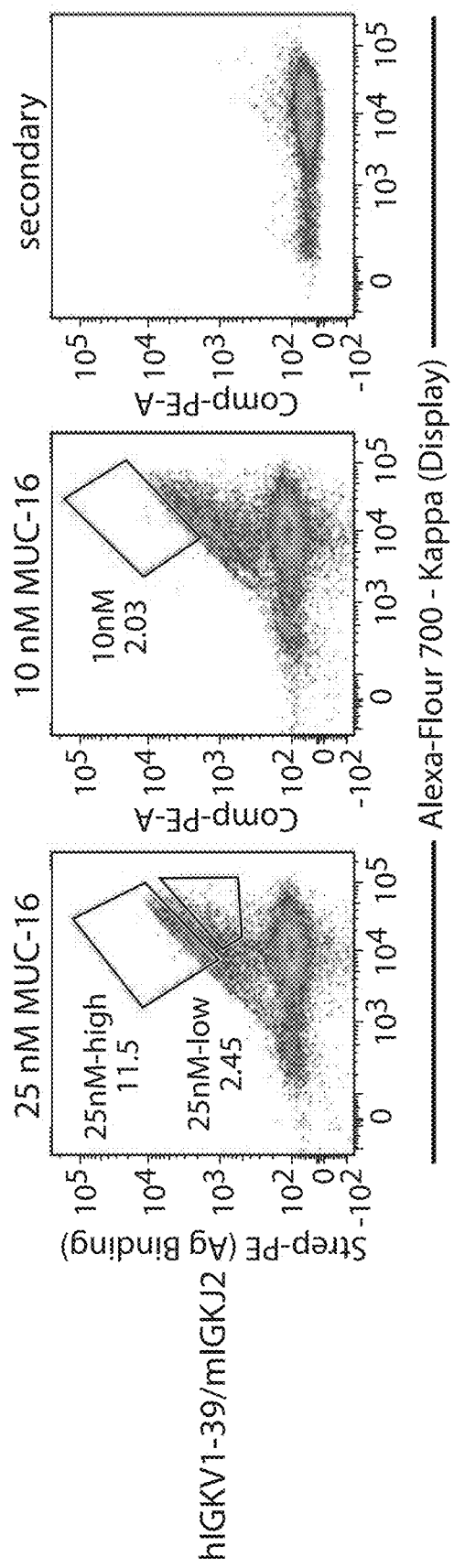
FIG. 18 shows cells sorted on a BD FACSAria with gates drawn to select cell populations with high or medium MUC-16 binding signals relative to display.
Figure 18:
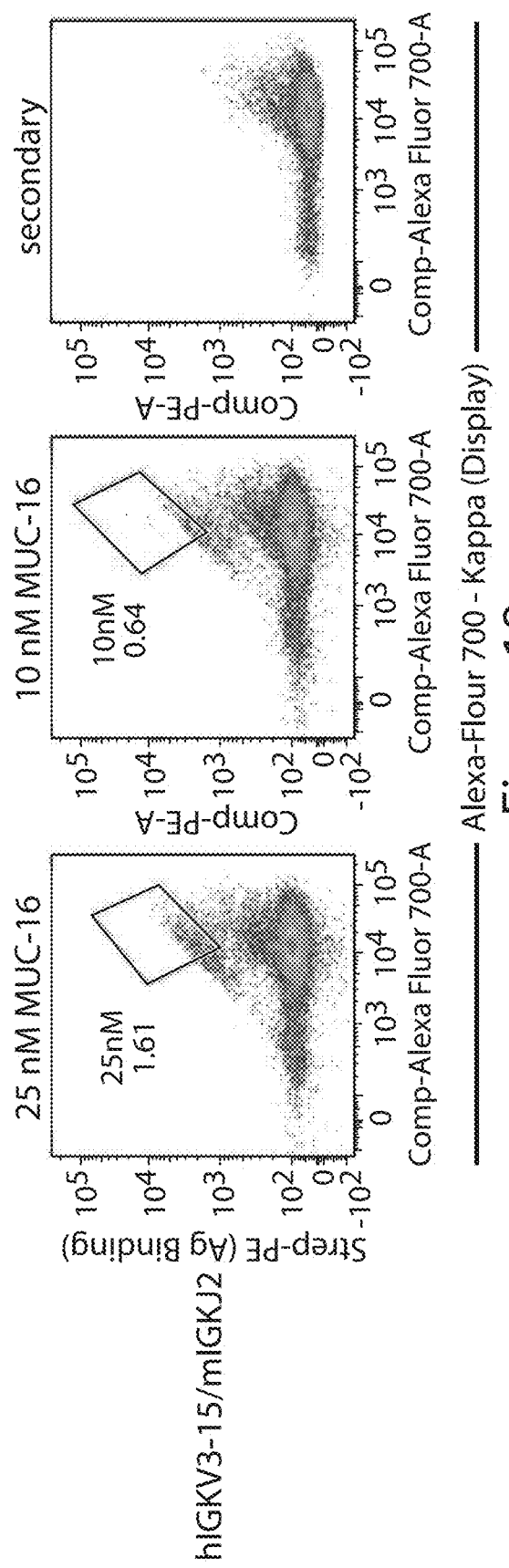

Acceptor cell lines derived from Expi293F cells (Thermo Fisher Scientific A14527) were transfected with DNA containing either the hIGKV1-39/mIGKJ2 or hIGKV3-15/mIGKJ2 libraries, such that a single antibody clone is genomically integrated and expressed on the surface of each cell. Cells were cultured in Expi293 Expression Medium (Thermo Fisher Scientific A1435101). Two days after transfection, $2 \times 10^8$ cells from each library were enriched by MACS for antibody surface expression using 100 nM biotinylated anti-human kappa antibody (Southern Biotech 2060-08) and 500 µL biotin binder DYNABEADS (Thermo Fisher Scientific 11047). After recovery, cells were labeled with 10 or 25 nM biotinylated MUC-16 antigen followed by 5 µg/ml each of biotin-PE (SouthernBiotech 6404-09) and anti-human-kappa-647 (SouthernBiotech 2062-31). Cells were sorted on a BD FACSAria with gates drawn to select cell populations with high or medium MUC-16 binding signals relative to display (FIG. 18). 5000 cells from each gate were sorted into 50 µL QuickExtract buffer (Lucigen QE09050).

Genomic PCR was performed with primers specific to the flanking regions around the integrated VH sequences and the product cloned into a soluble expression vector in frame with a human IgG1 constant domain. E. coli cells were transformed and individual colonies selected, mini-prepped, and sequenced. Unique sequences were transiently transfected in Expi293F cells at a 1:1 ratio with soluble expression vectors containing the corresponding hIGKV1-39/mIGKJ2 or hIGKV3-15/mIGKJ2 huKappa light-chain. Supernatants were harvested after 5 days and antibody purified on a Kingfisher Flex System using Protein-A magnetic beads followed by buffer exchange into PBS.

Figures 1, 20:
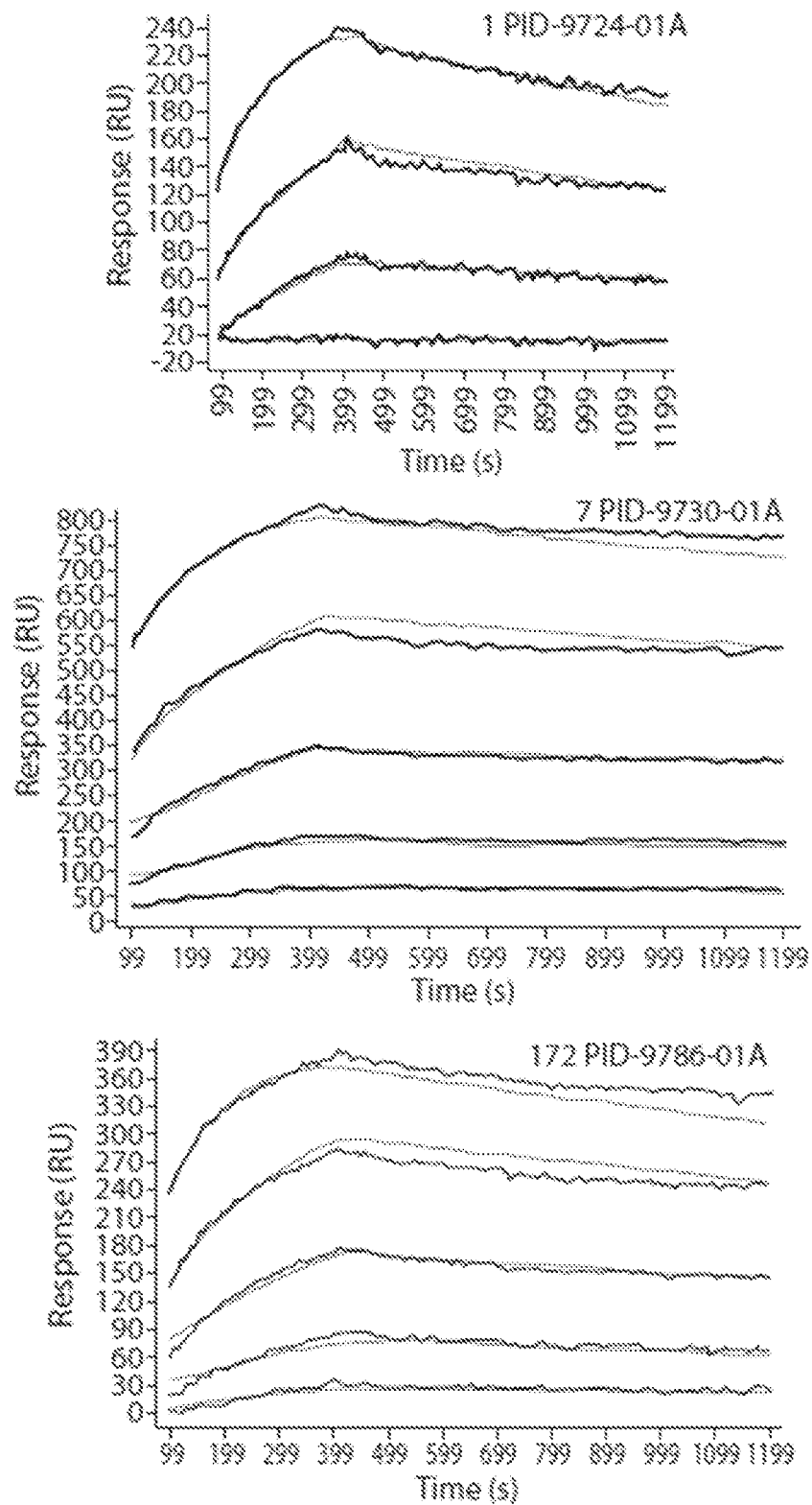
FIG. 20 shows exemplary traces from a subset of the 24 antibodies described in FIG. 19 that have monovalent $K_D$ values less than 100 nM.
Figures 2, 20:
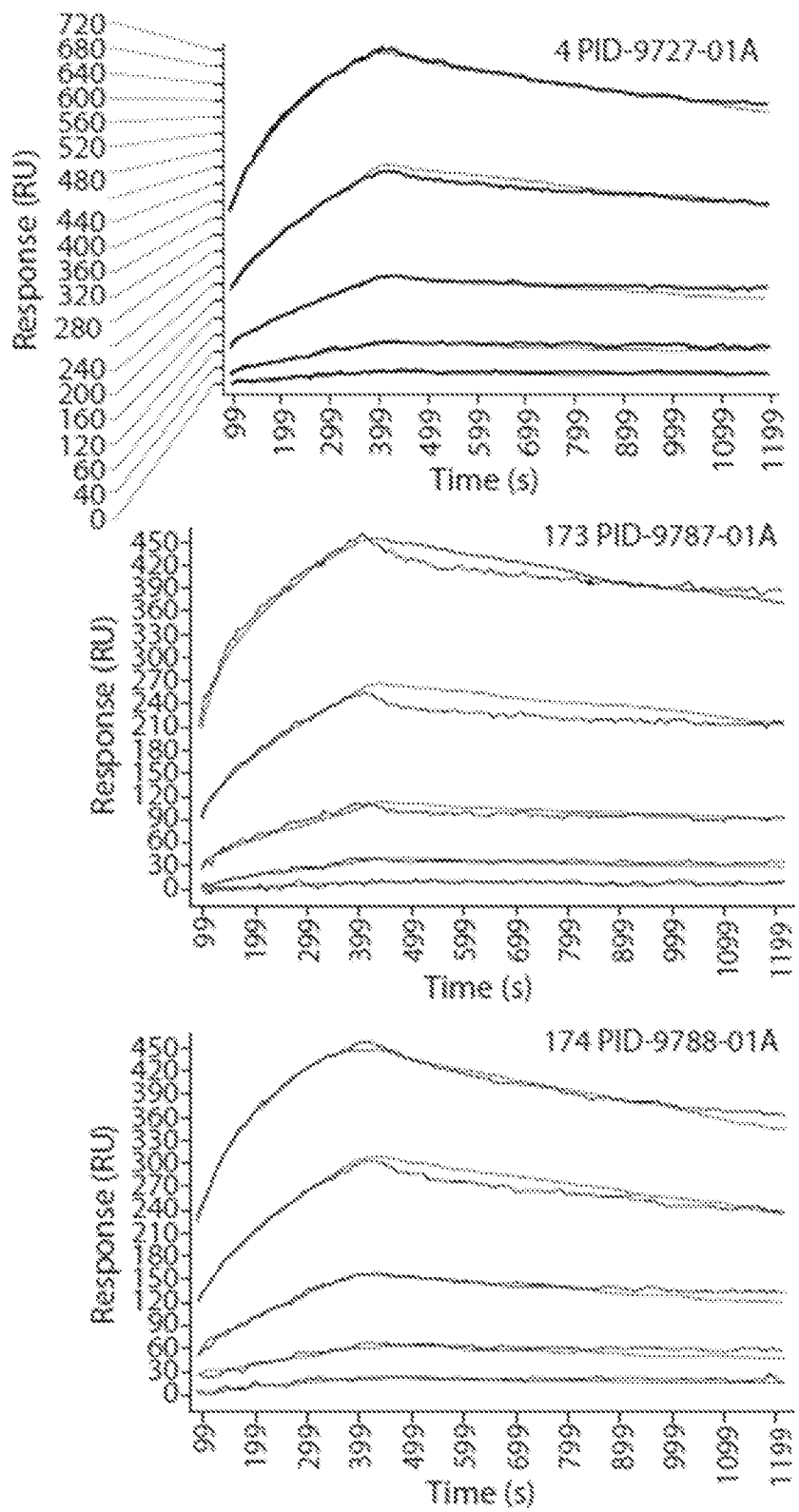
Figures 3, 20:
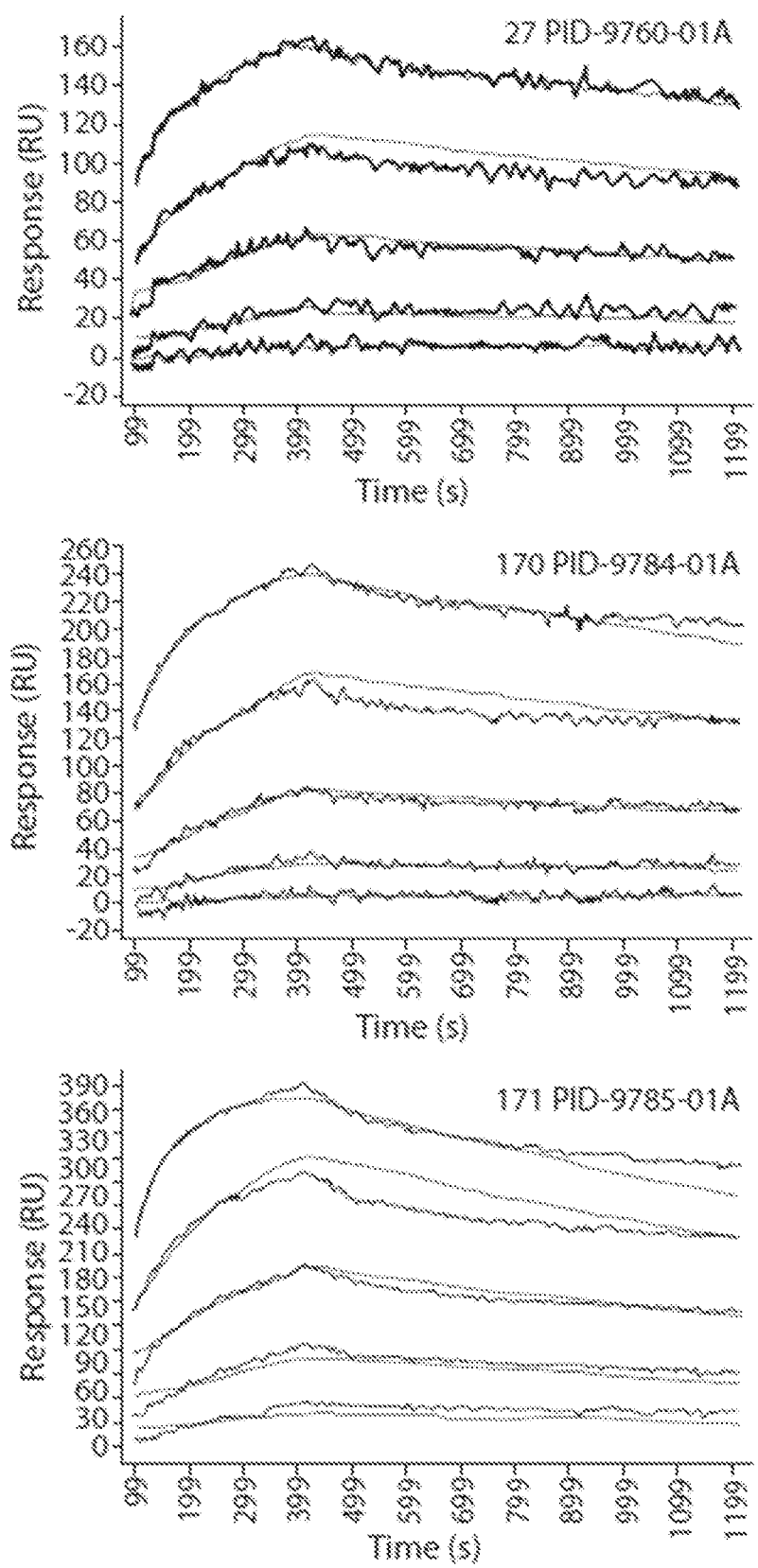
Figures 4, 20:
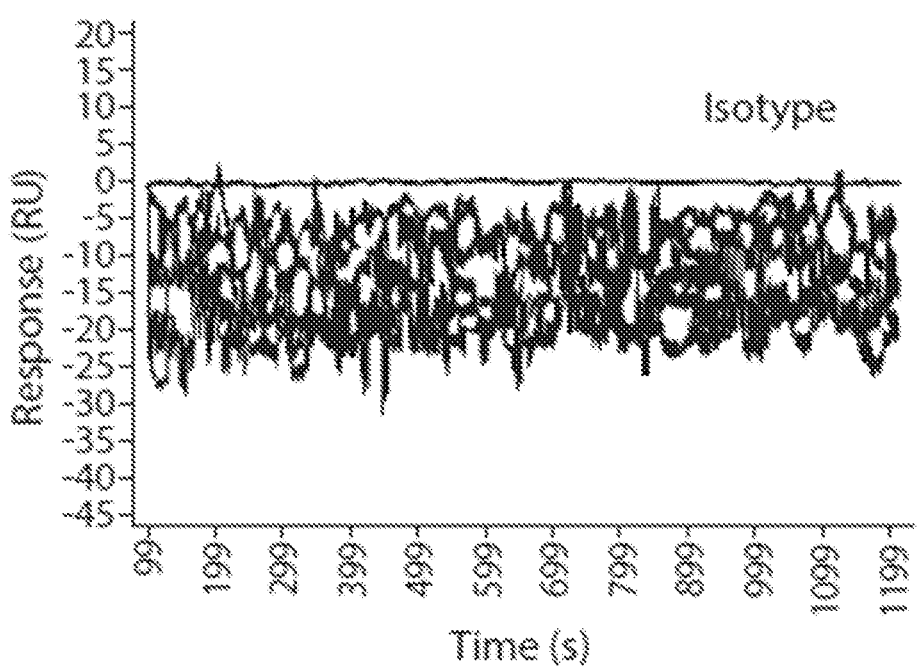

Antibody affinity was assessed by surface plasmon resonance (SPR) using the IBIS-MX96 Platform. Goat anti-human IgG capture antibody (Jackson ImmunoResearch) at 15 µg/ml in 10 mM sodium acetate pH 4.5 was immobilized onto a CMD50M sensor-chip (Xantec) using a standard amine-coupling procedure. The chip was activated with 0.2 M EDC/0.05 M sulfo-NHS and quenched with 0.5 M ethanolamine. Anti-MUC16 antibodies were captured on the chip at 15 µg/ml in IX PBS, 0.01% Tween20, pH 7.4. Recombinant his-tagged human MUC16 was serially diluted from 500 nM to 0.68 nM in PBS-T. After 10 cycles of running buffer injections, samples were injected. Association and dissociation step times used were 5 minutes and 10 minutes, respectively. After each cycle, the chip-surface was regenerated using 10 mM glycine pH 2. Data was calibrated using SPRINT software Version 1.9.3.2 (IBIS Technologies) and analyzed using NextGen KIT software Version 1.1.0 (Carterra) according to a 1:1 binding model. 24 antibodies had monovalent $K_D$ values less than 100 nM (FIG. 19) with example traces shown in FIG. 20.

SEQUENCES hVK1-39 AA sequence (V-region) (SEQ ID NO: 1)

```
  1 DIQMTQSPSS LSASVGDRVT ITCRASQSIS SYLNWYQQKP GKAPKLLIYA
 51 ASSLQSGVPS RFSGSGSGTD FTLTISSLQP EDFATYYCQQ SYSTP
``` hVK3-15 AA sequence (V-region) (SEQ ID NO: 2)

```
  1 EIVMTQSPAT LSVSPGERAT LSCRASQSVS SNLAWYQQKP GQAPRLLIYG
 51 ASTRATGIPA RFSGSGSGTE FTLTISSLQS EDFAVYYCQQ YNNWP
``` hVK1-39 DNA (V-region) (SEQ ID NO: 3)

```
  1 GACATCCAGA TGACCCAGTC TCCATCCTCC CTGTCTGCAT CTGTAGGAGA
 51 CAGAGTCACC ATCACTTGCC GGGCAAGTCA GAGCATTAGC AGCTATTTAA
101 ATTGGTATCA GCAGAAACCA GGGAAAGCCC CTAAGCTCCT GATCTATGCT
151 GCATCCAGTT TGCAAAGTGG GGTCCCATCA AGGTTCAGTG GCAGTGGATC
201 TGGGACAGAT TTCACTCTCA CCATCAGCAG TCTGCAACCT GAAGATTTTG
251 CAACTTACTA CTGTCAACAG AGTTACAGTA CCCCT
``` hVK3-15 DNA (V-region) (SEQ ID NO: 4)

```
  1 GAAATAGTGA TGACGCAGTC TCCAGCCACC CTGTCTGTGT CTCCAGGGGA
 51 AAGAGCCACC CTCTCCTGCA GGGCCAGTCA GAGTGTTAGC AGCAACTTAG
```

| SEQUENCES |
|---|
| 101 CCTGGTACCA GCAGAAACCT GGCCAGGCTC CCAGGCTCCT CATCTATGGT |
| 151 GCATCCACCA GGGCCACTGG TATCCCAGCC AGGTTCAGTG GCAGTGGGTC |
| 201 TGGGACAGAG TTCACTCTCA CCATCAGCAG CCTGCAGTCT GAAGATTTTG |
| 251 CAGTTTATTA CTGTCAGCAG TATAATAACT GGCCT | hVK1-39 AA sequence (V-region through J-region and mouse kappa constant domain)

(SEQ ID NO: 5)

1   DIQMTQSPSS LSASVGDRVT ITCRASQSIS SYLNWYQQKP GKAPKLLIYA

51  ASSLQSGVPS RFSGSGSGTD FTLTISSLQP EDFATYYCQQ SYSTPLTFGG

101 GTKLEIKRAD AAPTVSIFPP SSEQLTSGGA SVVCFLNNFY PKDINVKWKI

151 DGSERQNGVL NSWTDQDSKD STYSMSSTLT LTKDEYERHN SYTCEATHKT

201 STSPIVKSFN RNEC

The V-region is indicated by a single underline, the J-region is indicated by bold font, and the mouse kappa constant region is indicated by double underline.

hVK3-15 sequence (V-region through J-region and mouse kappa constant domain)

(SEQ ID NO: 6)

1   EIVMTQSPAT LSVSPGERAT LSCRASQSVS SNLAWYQQKP GQAPRLLIYG

51  ASTRATGIPA RFSGSGSGTE FTLTISSLQS EDFAVYYCQQ YNNWPLTFGG

101 GTKLEIKRAD AAPTVSIFPP SSEQLTSGGA SVVCFLNNFY PKDINVKWKI

151 DGSERQNGVL NSWTDQDSKD STYSMSSTLT LTKDEYERHN SYTCEATHKT

201 STSPIVKSFN RNEC

The V-region is indicated by a single underline, the J-region is indicated by bold font, and the mouse kappa constant region is indicated by double underline.

hVK1-39 AA sequence (V-region through J-region)

(SEQ ID NO: 7)

1   DIQMTQSPSS LSASVGDRVT ITCRASQSIS SYLNWYQQKP GKAPKLLIYA

51  ASSLQSGVPS RFSGSGSGTD FTLTISSLQP EDFATYYCQQ SYSTPLTFGG

101 GTKLEIK

The V-region is indicated by a single underline and the J-region is indicated by bold font.

hVK3-15 AA sequence (V-region through J-region)

(SEQ ID NO: 8)

1   EIVMTQSPAT LSVSPGERAT LSCRASQSVS SNLAWYQQKP GQAPRLLIYG

51  ASTRATGIPA RFSGSGSGTE FTLTISSLQS EDFAVYYCQQ YNNWPLTFGG

101 GTKLEIK

The V-region is indicated by a single underline and the J-region is indicated by bold font.

hVK1-39 DNA (V-region through J-region)

(SEQ ID NO: 9)

1   GACATCCAGA TGACCCAGTC TCCATCCTCC CTGTCTGCAT CTGTAGGAGA

51  CAGAGTCACC ATCACTTGCC GGGCAAGTCA GAGCATTAGC AGCTATTTAA

101 ATTGGTATCA GCAGAAACCA GGGAAAGCCC CTAAGCTCCT GATCTATGCT

151 GCATCCAGTT TGCAAAGTGG GGTCCCATCA AGGTTCAGTG GCAGTGGATC

201 TGGGACAGAT TTCACTCTCA CCATCAGCAG TCTGCAACCT GAAGATTTTG

251 CAACTTACTA CTGTCAACAG AGTTACAGTA CCCCTCTCAC GTTCGGAGGG

301 GGGACCAAGC TGGAAATAAA AC

The V-region is indicated by a single underline and the J-region is indicated by bold font.

hVK3-15DNA (V-region through J-region)

(SEQ ID NO: 10)

1   GAAATAGTGA TGACGCAGTC TCCAGCCACC CTGTCTGTGT CTCCAGGGGA

51  AAGAGCCACC CTCTCCTGCA GGGCCAGTCA GAGTGTTAGC AGCAACTTAG

| SEQUENCES |
|---|
| 101 <u>CCTGGTACCA GCAGAAACCT GGCCAGGCTC CCAGGCTCCT CATCTATGGT</u> |
| 151 <u>GCATCCACCA GGGCCACTGG TATCCCAGCC AGGTTCAGTG GCAGTGGGTC</u> |
| 201 <u>TGGGACAGAG TTCACTCTCA CCATCAGCAG CCTGCAGTCT GAAGATTTTG</u> |
| 251 <u>CAGTTTATTA CTGTCAGCAG TATAATAACT GGCCTCTC</u>AC GTTCGGAGGG |
| 301 GGGACCAAGC TGGAAATAAA AC |

The V-region is indicated by a <u>single underline</u> and the J-region is indicated by bold font.

(NKp46 antigen) -

SEQ ID NO: 11

QQQTLPKPFIWAEPHFMVPKEKQVTICCQGNYGAVEYQLHFEGSLFAVDRPKPPERINKVKF

YIPDMNSRMAGQYSCIYRVGELWSEPSNLLDLVVTEMYDTPTLSVHPGPEVISGEKVTFYCR

LDTATSMFLLLKEGRSSHVQRGYGKVQAEFPLGPVTTAHRGTYRCFGSYNNHAWSFPSEPVK

LLVTGDIENTSLAPEDPTFPADTWGTYLLTTETGLQKDHALWDHTAQNLLRSASPTIKPCPP

CKCPAPNLLGGPSVFIFPPKIKDVLMISLSPIVICVVVDVSEDDPDVQISWFVNNVEVHTAQ

TQTHREDYNSTLRVVSALPIQHQDWMSGKEFKCKVNNKDLPAPIERTISKPKGSVRAPQVYV

LPPPEEEMTKKQVTLTCMVTDFMPEDIYVEWTNNGKTELNYKNTEPVLDSDGSYFMYSKLRV

EKKNWVERNSYSCSVVHEGLHNHHTTKSFSRTPG (MUC-16 antigen) -

SEQ ID NO: 12

PGSRKFNTTERVLQGLLRPLFKNTSVGPLYSGCRLTLLRPEKDGEATGVDAICTHRPDPTGP

GLDREQLYLELSQLTHSITELGPYTLDRDSLYVNGFTHRSSVPTTSTGVVSEEPFTLNFTIN

NLRYMADMGQPGSLKFNITDNVMQHLLSPLFQRSSLGARYTGCRVIALRSVKNGAETRVDLL

CTYLQPLSGPGLPIKQVFHELSQQTHGITRLGPYSLDKDSLYLNGYNEPGPDEPPTTPKPAT

TFLPPLSEATTAMGYHLKTLTLNFTISNLQYSPDMGKGSATFNSTEGVLQHLLRPLFQKSSM

GPFYLGCQLISLRPEKDGAATGVDTTCTYHPDPVGPGLDIQQLYWELSQLTHGVTQLGFYVL

DRDSLFINGYAPQNLSIRGEYQINFHIVNWNLSNPDPTSSEYITLLRDIQDKVTTLYKGSQL

HDTFRFCLVTNLTMDSVLVTVKALFSSNLDPSLVEQVFLDKTLNASFHWLGSTYQLVDIHVT

EMESSVYQPTSSSSTQHFYLNFTITNLPYSQDKAQPGTTNYQRNKRNIEDALNQLFRNSSIK

SYFSDCQVSTFRSVPNRHHTGVDSLCNFSPLARRVDRVAIYEEFLRMTRNGTQLQNFTLDRS

SVLVDGYSPNRNEPLTGNSDLPASGGGGSGGGGSHHHHHH

---

I claim:

1. A transgenic mouse, comprising in its germline a hybrid variable immunoglobulin (Ig) light chain locus comprising a human light chain Ig V kappa (Vκ) gene segment operably linked to a mouse light chain Ig J kappa (Jκ) gene segment, wherein the mouse light chain Ig Jκ is selected from the group consisting of mouse Jκ1, mouse Jκ2, mouse Jκ3, mouse Jκ4, and mouse Jκ5.

2. The transgenic mouse of claim 1, wherein the human light chain immunoglobulin Vκ gene segment comprises Vκ1-39 or Vκ3-15.

3. The transgenic mouse of claim 1, wherein the hybrid variable Ig light chain locus is at an endogenous mouse Ig light chain locus or replaces an endogenous murine Jκ locus.

4. The transgenic mouse of claim 1, wherein the endogenous murine Vκ locus is not disrupted.

5. The transgenic mouse of claim 1, wherein the hybrid variable immunoglobulin (Ig) light chain locus is operably linked to an endogenous mouse Ig light chain constant region gene sequence.

6. The transgenic mouse of claim 1, wherein the mouse light chain Ig Jκ segment comprises mouse Jκ2.

7. The transgenic mouse of claim 1, wherein the transgenic mouse expresses a hybrid light chain comprising a human Vκ segment joined to a mouse Jκ segment from the hybrid variable Ig light chain locus in response to antigen challenge.

8. The transgenic mouse of claim 7, wherein the hybrid light chain is capable of pairing with an Ig heavy chain.

9. The transgenic mouse of claim 1, wherein the human light chain Ig Vκ gene segment encodes a light chain Ig Vk segment comprising the amino acid sequence SEQ ID NO: 1 or SEQ ID NO: 2.

10. The transgenic mouse of claim 1, wherein expression from the hybrid variable Ig light chain locus is under the control of a promoter selected from the group consisting of CD19, CD20, μHC, VpreB1, VpreB2, VpreB3, λ5, Igα, Igβ, κLC, λLC, BSAP (Pax5), and IGKV3-15.

11. The transgenic mouse of claim 10, wherein the promoter is a human IGKV3-15 promoter.

12. The transgenic mouse of claim 1, wherein the hybrid variable light chain locus further comprises, at 5' of the human light chain Ig Vκ gene segment: a lox p sequence, an IGKV3-15 promoter, and a human or a mouse leader sequence.

13. The transgenic mouse of claim 1, wherein the transgenic mouse comprises an endogenous heavy chain locus.

14. The transgenic mouse of claim 1, wherein the human light chain Ig Vκ gene segment and mouse light chain Ig Jκ gene segment does not undergo rearrangement.

15. A transgenic mouse, comprising in its germline a hybrid variable immunoglobulin (Ig) light chain locus comprising a human light chain Ig V kappa (Vκ) gene segment operably linked to a mouse light chain Ig J kappa (Jκ) gene segment, wherein a hybrid variable Ig light chain transgene is inserted by site-specific integration to replace an endogenous murine Ig Jκ locus, and wherein hybrid variable Ig light chain locus is operatively linked to an endogenous mouse light chain constant region gene segment, wherein the human light chain immunoglobulin Vκ gene segment comprises Vκ1-39 or Vκ3-15, and wherein the mouse light chain Ig Jκ segment is selected from the group consisting of mouse Jκ1, mouse Jκ2, mouse Jκ3, mouse Jκ4, and mouse Jκ5.

16. The transgenic mouse of claim 15, wherein the mouse light chain Ig Jκ segment comprises Jκ2.

17. The transgenic mouse of claim 15, wherein they endogenous murine Vκ locus is not disrupted.

18. The transgenic mouse of claim 15, wherein the transgenic mouse expresses a hybrid light chain comprising a human Vκ segment joined to a mouse Jκ segment from the hybrid variable Ig light chain locus in response to antigen challenge.

19. The transgenic mouse of claim 18, wherein the hybrid light chain is capable of pairing with an Ig heavy chain.

20. The transgenic mouse of claim 15, wherein the human light chain Ig Vκ gene segment encodes a light chain Ig Vκ segment comprising the amino acid sequence SEQ ID NO: 1 or SEQ ID NO: 2.

21. The transgenic mouse of claim 15, wherein expression from the hybrid variable Ig light chain locus is under the control of a promoter selected from the group consisting of CD19, CD20, μHC, VpreB1, VpreB2, VpreB3, λ5, Igα, Igβ, κLC, λLC, BSAP (Pax5), and IGKV3-15.

22. The transgenic mouse of claim 21, wherein the promoter is a human IGKV3-15 promoter.

23. The transgenic mouse of claim 15, wherein the hybrid variable light chain locus further comprises, at 5' of the human light chain Ig Vκ gene segment: a lox p sequence, an IGKV3-15 promoter, and a human or a mouse leader sequence.

24. The transgenic mouse of claim 15, wherein the transgenic mouse comprises an endogenous heavy chain locus.

25. The transgenic mouse of claim 15, wherein the human light chain Ig Vκ gene segment and mouse light chain Ig Jκ gene segment does not undergo rearrangement.

26. The transgenic mouse of claim 15, wherein the hybrid variable light chain transgene is inserted by site-specific integration using a gene editing system selected from the group consisting of: a clustered regularly interspaced short palindromic repeats (CRISPR/Cas9) system, a transcriptional activator-like effector nuclease (TALEN), a zinc finger nuclease (ZFN), a meganuclease, a recombinase, a flippase, a transposase, and an Argonaute protein.

* * * * *

SEQUENCE LISTING

<160> NUMBER OF SEQ ID NOS: 12

<210> SEQ ID NO 1
<211> LENGTH: 95
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 1

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

```
Leu Asn Trp Tyr Gln Gln Lys Pro Gly Lys Ala Pro Lys Leu Leu Ile
            35                  40                  45

Tyr Ala Ala Ser Ser Leu Gln Ser Gly Val Pro Ser Arg Phe Ser Gly
        50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro
                85                  90                  95

<210> SEQ ID NO 2
<211> LENGTH: 95
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 2

Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Asn
            20                  25                  30

Leu Ala Trp Tyr Gln Gln Lys Pro Gly Gln Ala Pro Arg Leu Leu Ile
            35                  40                  45

Tyr Gly Ala Ser Thr Arg Ala Thr Gly Ile Pro Ala Arg Phe Ser Gly
        50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Asn Asn Trp Pro
                85                  90                  95

<210> SEQ ID NO 3
<211> LENGTH: 285
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 3
gacatccaga tgacccagtc tccatcctcc ctgtctgcat ctgtaggaga cagagtcacc        60
atcacttgcc gggcaagtca gagcattagc agctatttaa attggtatca gcagaaacca       120
gggaaagccc ctaagctcct gatctatgct gcatccagtt tgcaaagtgg ggtcccatca       180
aggttcagtg gcagtggatc tgggacagat tcactctca ccatcagcag tctgcaacct        240
gaagattttg caacttacta ctgtcaacag agttacagta cccct                       285

<210> SEQ ID NO 4
<211> LENGTH: 285
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 4
gaaatagtga tgacgcagtc tccagccacc ctgtctgtgt ctccagggga aagagccacc        60
```

```
ctctcctgca gggccagtca gagtgttagc agcaacttag cctggtacca gcagaaacct    120
ggccaggctc ccaggctcct catctatggt gcatccacca gggccactgg tatcccagcc    180
aggttcagtg gcagtgggtc tgggacagag ttcactctca ccatcagcag cctgcagtct    240
gaagattttg cagtttatta ctgtcagcag tataataact ggcct                   285
```

<210> SEQ ID NO 5
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 5

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Leu
                85                  90                  95

Thr Phe Gly Gly Gly Thr Lys Leu Glu Ile Lys Arg Ala Asp Ala Ala
            100                 105                 110

Pro Thr Val Ser Ile Phe Pro Pro Ser Ser Glu Gln Leu Thr Ser Gly
        115                 120                 125

Gly Ala Ser Val Val Cys Phe Leu Asn Asn Phe Tyr Pro Lys Asp Ile
    130                 135                 140

Asn Val Lys Trp Lys Ile Asp Gly Ser Glu Arg Gln Asn Gly Val Leu
145                 150                 155                 160

Asn Ser Trp Thr Asp Gln Asp Ser Lys Asp Ser Thr Tyr Ser Met Ser
                165                 170                 175

Ser Thr Leu Thr Leu Thr Lys Asp Glu Tyr Glu Arg His Asn Ser Tyr
            180                 185                 190

Thr Cys Glu Ala Thr His Lys Thr Ser Thr Ser Pro Ile Val Lys Ser
        195                 200                 205

Phe Asn Arg Asn Glu Cys
    210
```

<210> SEQ ID NO 6
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 6

```
Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Asn
            20                  25                  30
```

Leu Ala Trp Tyr Gln Gln Lys Pro Gly Gln Ala Pro Arg Leu Leu Ile
            35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Asn Asn Trp Pro Leu
                85                  90                  95

Thr Phe Gly Gly Gly Thr Lys Leu Glu Ile Lys Arg Ala Asp Ala Ala
            100                 105                 110

Pro Thr Val Ser Ile Phe Pro Pro Ser Ser Glu Gln Leu Thr Ser Gly
            115                 120                 125

Gly Ala Ser Val Val Cys Phe Leu Asn Asn Phe Tyr Pro Lys Asp Ile
            130                 135                 140

Asn Val Lys Trp Lys Ile Asp Gly Ser Glu Arg Gln Asn Gly Val Leu
145                 150                 155                 160

Asn Ser Trp Thr Asp Gln Asp Ser Lys Asp Ser Thr Tyr Ser Met Ser
                165                 170                 175

Ser Thr Leu Thr Leu Thr Lys Asp Glu Tyr Glu Arg His Asn Ser Tyr
            180                 185                 190

Thr Cys Glu Ala Thr His Lys Thr Ser Thr Ser Pro Ile Val Lys Ser
            195                 200                 205

Phe Asn Arg Asn Glu Cys
            210

<210> SEQ ID NO 7
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 7

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
            35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Leu
                85                  90                  95

Thr Phe Gly Gly Gly Thr Lys Leu Glu Ile Lys
            100                 105

<210> SEQ ID NO 8
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 8

Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Asn
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Asn Asn Trp Pro Leu
                85                  90                  95

Thr Phe Gly Gly Gly Thr Lys Leu Glu Ile Lys
            100                 105

<210> SEQ ID NO 9
<211> LENGTH: 322
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 9
gacatccaga tgacccagtc tccatcctcc ctgtctgcat ctgtaggaga cagagtcacc      60
atcacttgcc gggcaagtca gagcattagc agctatttaa attggtatca gcagaaacca    120
gggaaagccc ctaagctcct gatctatgct gcatccagtt tgcaaagtgg ggtcccatca    180
aggttcagtg gcagtggatc tgggacagat ttcactctca ccatcagcag tctgcaacct    240
gaagattttg caacttacta ctgtcaacag agttacagta cccctctcac gttcggaggg    300
gggaccaagc tggaaataaa ac                                              322

<210> SEQ ID NO 10
<211> LENGTH: 322
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 10
gaaatagtga tgacgcagtc tccagccacc ctgtctgtgt ctccagggga aagagccacc      60
ctctcctgca gggccagtca gagtgttagc agcaacttag cctggtacca gcagaaacct    120
ggccaggctc ccaggctcct catctatggt gcatccacca gggccactgg tatcccagcc    180
aggttcagtg gcagtgggtc tgggacagag ttcactctca ccatcagcag cctgcagtct    240
gaagattttg cagtttatta ctgtcagcag tataataact ggcctctcac gttcggaggg    300
gggaccaagc tggaaataaa ac                                              322

<210> SEQ ID NO 11
<211> LENGTH: 468
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 11

```
Gln Gln Gln Thr Leu Pro Lys Pro Phe Ile Trp Ala Glu Pro His Phe
 1               5                  10                  15

Met Val Pro Lys Glu Lys Gln Val Thr Ile Cys Cys Gln Gly Asn Tyr
            20                  25                  30

Gly Ala Val Glu Tyr Gln Leu His Phe Glu Gly Ser Leu Phe Ala Val
        35                  40                  45

Asp Arg Pro Lys Pro Pro Glu Arg Ile Asn Lys Val Lys Phe Tyr Ile
    50                  55                  60

Pro Asp Met Asn Ser Arg Met Ala Gly Gln Tyr Ser Cys Ile Tyr Arg
65                  70                  75                  80

Val Gly Glu Leu Trp Ser Glu Pro Ser Asn Leu Leu Asp Leu Val Val
                85                  90                  95

Thr Glu Met Tyr Asp Thr Pro Thr Leu Ser Val His Pro Gly Pro Glu
            100                 105                 110

Val Ile Ser Gly Glu Lys Val Thr Phe Tyr Cys Arg Leu Asp Thr Ala
        115                 120                 125

Thr Ser Met Phe Leu Leu Leu Lys Glu Gly Arg Ser Ser His Val Gln
    130                 135                 140

Arg Gly Tyr Gly Lys Val Gln Ala Glu Phe Pro Leu Gly Pro Val Thr
145                 150                 155                 160

Thr Ala His Arg Gly Thr Tyr Arg Cys Phe Gly Ser Tyr Asn Asn His
                165                 170                 175

Ala Trp Ser Phe Pro Ser Glu Pro Val Lys Leu Leu Val Thr Gly Asp
            180                 185                 190

Ile Glu Asn Thr Ser Leu Ala Pro Glu Asp Pro Thr Phe Pro Ala Asp
        195                 200                 205

Thr Trp Gly Thr Tyr Leu Leu Thr Thr Glu Thr Gly Leu Gln Lys Asp
    210                 215                 220

His Ala Leu Trp Asp His Thr Ala Gln Asn Leu Leu Arg Ser Ala Ser
225                 230                 235                 240

Pro Thr Ile Lys Pro Cys Pro Pro Cys Lys Cys Pro Ala Pro Asn Leu
                245                 250                 255

Leu Gly Gly Pro Ser Val Phe Ile Phe Pro Pro Lys Ile Lys Asp Val
            260                 265                 270

Leu Met Ile Ser Leu Ser Pro Ile Val Thr Cys Val Val Val Asp Val
        275                 280                 285

Ser Glu Asp Asp Pro Asp Val Gln Ile Ser Trp Phe Val Asn Asn Val
    290                 295                 300

Glu Val His Thr Ala Gln Thr Gln Thr His Arg Glu Asp Tyr Asn Ser
305                 310                 315                 320

Thr Leu Arg Val Val Ser Ala Leu Pro Ile Gln His Gln Asp Trp Met
                325                 330                 335

Ser Gly Lys Glu Phe Lys Cys Lys Val Asn Asn Lys Asp Leu Pro Ala
            340                 345                 350

Pro Ile Glu Arg Thr Ile Ser Lys Pro Lys Gly Ser Val Arg Ala Pro
        355                 360                 365

Gln Val Tyr Val Leu Pro Pro Pro Glu Glu Glu Met Thr Lys Lys Gln
    370                 375                 380

Val Thr Leu Thr Cys Met Val Thr Asp Phe Met Pro Glu Asp Ile Tyr
385                 390                 395                 400
```

```
Val Glu Trp Thr Asn Asn Gly Lys Thr Glu Leu Asn Tyr Lys Asn Thr
                405                 410                 415

Glu Pro Val Leu Asp Ser Asp Gly Ser Tyr Phe Met Tyr Ser Lys Leu
            420                 425                 430

Arg Val Glu Lys Lys Asn Trp Val Glu Arg Asn Ser Tyr Ser Cys Ser
        435                 440                 445

Val Val His Glu Gly Leu His Asn His His Thr Thr Lys Ser Phe Ser
450                 455                 460

Arg Thr Pro Gly
465

<210> SEQ ID NO 12
<211> LENGTH: 660
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 12

Pro Gly Ser Arg Lys Phe Asn Thr Thr Glu Arg Val Leu Gln Gly Leu
1               5                   10                  15

Leu Arg Pro Leu Phe Lys Asn Thr Ser Val Gly Pro Leu Tyr Ser Gly
            20                  25                  30

Cys Arg Leu Thr Leu Leu Arg Pro Glu Lys Asp Gly Glu Ala Thr Gly
        35                  40                  45

Val Asp Ala Ile Cys Thr His Arg Pro Asp Pro Thr Gly Pro Gly Leu
50                  55                  60

Asp Arg Glu Gln Leu Tyr Leu Glu Leu Ser Gln Leu Thr His Ser Ile
65                  70                  75                  80

Thr Glu Leu Gly Pro Tyr Thr Leu Asp Arg Asp Ser Leu Tyr Val Asn
                85                  90                  95

Gly Phe Thr His Arg Ser Ser Val Pro Thr Thr Ser Thr Gly Val Val
            100                 105                 110

Ser Glu Glu Pro Phe Thr Leu Asn Phe Thr Ile Asn Asn Leu Arg Tyr
        115                 120                 125

Met Ala Asp Met Gly Gln Pro Gly Ser Leu Lys Phe Asn Ile Thr Asp
130                 135                 140

Asn Val Met Gln His Leu Leu Ser Pro Leu Phe Gln Arg Ser Ser Leu
145                 150                 155                 160

Gly Ala Arg Tyr Thr Gly Cys Arg Val Ile Ala Leu Arg Ser Val Lys
                165                 170                 175

Asn Gly Ala Glu Thr Arg Val Asp Leu Leu Cys Thr Tyr Leu Gln Pro
            180                 185                 190

Leu Ser Gly Pro Gly Leu Pro Ile Lys Gln Val Phe His Glu Leu Ser
        195                 200                 205

Gln Gln Thr His Gly Ile Thr Arg Leu Gly Pro Tyr Ser Leu Asp Lys
210                 215                 220

Asp Ser Leu Tyr Leu Asn Gly Tyr Asn Glu Pro Gly Pro Asp Glu Pro
225                 230                 235                 240

Pro Thr Thr Pro Lys Pro Ala Thr Thr Phe Leu Pro Pro Leu Ser Glu
                245                 250                 255

Ala Thr Thr Ala Met Gly Tyr His Leu Lys Thr Leu Thr Leu Asn Phe
            260                 265                 270
```

```
Thr Ile Ser Asn Leu Gln Tyr Ser Pro Asp Met Gly Lys Gly Ser Ala
            275                 280                 285

Thr Phe Asn Ser Thr Glu Gly Val Leu Gln His Leu Leu Arg Pro Leu
        290                 295                 300

Phe Gln Lys Ser Ser Met Gly Pro Phe Tyr Leu Gly Cys Gln Leu Ile
305                 310                 315                 320

Ser Leu Arg Pro Glu Lys Asp Gly Ala Ala Thr Gly Val Asp Thr Thr
                325                 330                 335

Cys Thr Tyr His Pro Asp Pro Val Gly Pro Gly Leu Asp Ile Gln Gln
            340                 345                 350

Leu Tyr Trp Glu Leu Ser Gln Leu Thr His Gly Val Thr Gln Leu Gly
        355                 360                 365

Phe Tyr Val Leu Asp Arg Asp Ser Leu Phe Ile Asn Gly Tyr Ala Pro
370                 375                 380

Gln Asn Leu Ser Ile Arg Gly Glu Tyr Gln Ile Asn Phe His Ile Val
385                 390                 395                 400

Asn Trp Asn Leu Ser Asn Pro Asp Pro Thr Ser Glu Tyr Ile Thr
                405                 410                 415

Leu Leu Arg Asp Ile Gln Asp Lys Val Thr Thr Leu Tyr Lys Gly Ser
                420                 425                 430

Gln Leu His Asp Thr Phe Arg Phe Cys Leu Val Thr Asn Leu Thr Met
            435                 440                 445

Asp Ser Val Leu Val Thr Val Lys Ala Leu Phe Ser Ser Asn Leu Asp
450                 455                 460

Pro Ser Leu Val Glu Gln Val Phe Leu Asp Lys Thr Leu Asn Ala Ser
465                 470                 475                 480

Phe His Trp Leu Gly Ser Thr Tyr Gln Leu Val Asp Ile His Val Thr
                485                 490                 495

Glu Met Glu Ser Ser Val Tyr Gln Pro Thr Ser Ser Ser Thr Gln
                500                 505                 510

His Phe Tyr Leu Asn Phe Thr Ile Thr Asn Leu Pro Tyr Ser Gln Asp
            515                 520                 525

Lys Ala Gln Pro Gly Thr Thr Asn Tyr Gln Arg Asn Lys Arg Asn Ile
530                 535                 540

Glu Asp Ala Leu Asn Gln Leu Phe Arg Asn Ser Ser Ile Lys Ser Tyr
545                 550                 555                 560

Phe Ser Asp Cys Gln Val Ser Thr Phe Arg Ser Val Pro Asn Arg His
                565                 570                 575

His Thr Gly Val Asp Ser Leu Cys Asn Phe Ser Pro Leu Ala Arg Arg
            580                 585                 590

Val Asp Arg Val Ala Ile Tyr Glu Glu Phe Leu Arg Met Thr Arg Asn
            595                 600                 605

Gly Thr Gln Leu Gln Asn Phe Thr Leu Asp Arg Ser Ser Val Leu Val
        610                 615                 620

Asp Gly Tyr Ser Pro Asn Arg Asn Glu Pro Leu Thr Gly Asn Ser Asp
625                 630                 635                 640

Leu Pro Ala Ser Gly Gly Gly Ser Gly Gly Gly Ser His His
                645                 650                 655

His His His His
        660
```